US012737452B1

(12) United States Patent
Hanson et al.

(10) Patent No.: US 12,737,452 B1
(45) Date of Patent: Sep. 15, 2026

(54) CONFIGURABLE PLAYBOOKS IN AN IT AND SECURITY OPERATIONS APPLICATION

(71) Applicant: Cisco Technology, Inc., San Jose, CA (US)

(72) Inventors: Matthew Hanson, San Jose, CA (US); Kelby Jordan Shelton, Grandview, MO (US); Robert Wylie Gresham, Mount Pleasant, SC (US); Philip Royer, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 666 days.

(21) Appl. No.: 17/877,447

(22) Filed: Jul. 29, 2022

(51) Int. Cl.
*G06F 9/44* (2018.01)
*G06F 21/55* (2013.01)
*H04L 9/40* (2022.01)
*H04L 67/53* (2022.01)

(52) U.S. Cl.
CPC .............. *G06F 21/55* (2013.01); *H04L 63/20* (2013.01); *H04L 67/53* (2022.05)

(58) Field of Classification Search
CPC ........................................................ G06F 21/55
USPC ........................................................ 717/105
See application file for complete search history.

(56) References Cited

U.S. PATENT DOCUMENTS 7,334,219 B2 * 2/2008 Cebula ................ G06F 11/3688 717/124
7,937,344 B2 5/2011 Baum et al.
8,112,425 B2 2/2012 Baum et al.
8,751,529 B2 6/2014 Zhang et al.
8,788,525 B2 7/2014 Neels et al.
9,215,240 B2 12/2015 Merza et al.
9,286,413 B1 3/2016 Coates et al.
9,891,971 B1 * 2/2018 Kuhhirte ............. G06F 11/0709
10,127,258 B2 11/2018 Lamas et al.

(Continued)

FOREIGN PATENT DOCUMENTS

EP 3671452 A1 * 6/2020 ......... G06F 9/45558

OTHER PUBLICATIONS

Splunk Enterprise 8.0.0 Overview, available online, retrieved May 20, 2020 from docs.splunk.com.

(Continued)

*Primary Examiner* — Evral E Bodden
(74) *Attorney, Agent, or Firm* — Kilpatrick Townsend & Stockton LLP

(57) ABSTRACT

Techniques are described for providing a new "capability block" for information technology (IT) and security operations application playbooks. A capability block broadly enables playbook creators to create automations including generic actions that are not tied to computing environment-specific assumptions about a computing environment in which the playbook is to be executed. Once a playbook containing one or more capability blocks is distributed to a user's computing environment, a user can use a visual playbook editor or other interface to configure the capability blocks for their environment. The configuration of a capability block can include selecting an input playbook that accepts input parameters and provides output parameters required by the capability block, where the input playbook includes implementation steps for a particular type of computing environment.

17 Claims, 10 Drawing Sheets

600

Causing, by an information technology (IT) and security operations application, display of an automation playbook including a capability block, wherein the automation playbook defines a collection of actions to be performed based on an event provided as input to the automation playbook, and wherein the capability block includes a parameter specification indicating set of one or more input parameters and one or more output parameters associated with the capability block
602

Receiving input selecting an input playbook to assign to the capability block, wherein the input playbook accepts as input the one or more input parameters and, upon execution, generates the one or more output parameters
604

Executing the automation playbook, wherein executing the automation playbook includes, upon reaching the capability block, invoking execution of the input playbook
606

(56) References Cited

U.S. PATENT DOCUMENTS

| | | | | |
|---|---|---|---|---|
| 11,061,705 | B2 * | 7/2021 | Savant | G06F 9/45558 |
| 11,714,683 | B1 * | 8/2023 | Roberts | G06F 9/5027 709/223 |
| 12,299,497 | B2 * | 5/2025 | Johnston | G06F 9/5072 |
| 2015/0339154 | A1 * | 11/2015 | Wen | G06F 9/46 718/102 |
| 2018/0005629 | A1 * | 1/2018 | Crook | G10L 15/18 |
| 2019/0098106 | A1 | 3/2019 | Mungel et al. | |
| 2019/0104137 | A1 * | 4/2019 | Hailpern | H04L 63/1408 |
| 2020/0222803 | A1 * | 7/2020 | Parker | A63F 13/355 |
| 2022/0292415 | A1 * | 9/2022 | Walthers | G06Q 10/0633 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carasso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

Figure 6:
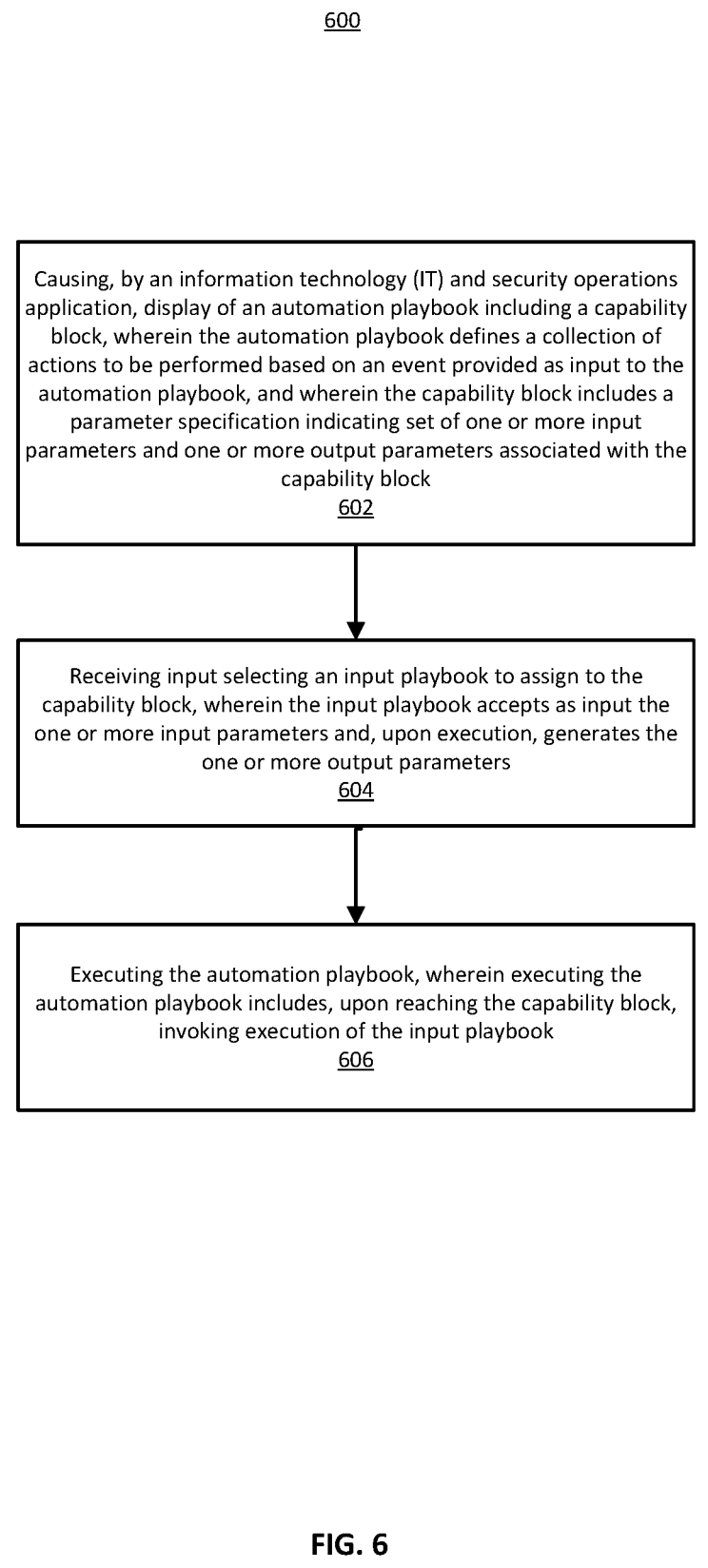

600

Causing, by an information technology (IT) and security operations application, display of an automation playbook including a capability block, wherein the automation playbook defines a collection of actions to be performed based on an event provided as input to the automation playbook, and wherein the capability block includes a parameter specification indicating set of one or more input parameters and one or more output parameters associated with the capability block
602

Receiving input selecting an input playbook to assign to the capability block, wherein the input playbook accepts as input the one or more input parameters and, upon execution, generates the one or more output parameters
604

Executing the automation playbook, wherein executing the automation playbook includes, upon reaching the capability block, invoking execution of the input playbook
606

CONFIGURABLE PLAYBOOKS IN AN IT AND SECURITY OPERATIONS APPLICATION

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Monitoring the operation and security of even a moderately complex computing environment typically involves a large number of tasks including, for example, investigating alerts generated by various operational and security monitoring applications, performing tasks to detect, triage, and respond to identified threats, and the like. To aid users and organizations with these and other tasks, some data intake and query systems provide users with a range of information technology (IT) and security-related applications (such as, e.g., security intelligence management services, Security Orchestration, Automation, and Response (SOAR) applications enterprise security applications, etc.). These applications broadly enable users to automatically monitor, detect, and investigate IT and security-related incidents, to automate repetitive tasks, and to strengthen defenses by connecting and coordinating complex workflows across security analyst teams and tools.

BRIEF DESCRIPTION OF THE DRAWINGS

Illustrative examples are described in detail below with reference to the following figures:

FIG. 6 is a flow diagram illustrating operations of a method for executing, by an IT and security operations application, an automation playbook including a capability block implemented by an input playbook according to some examples.

DETAILED DESCRIPTION

Figure 1:
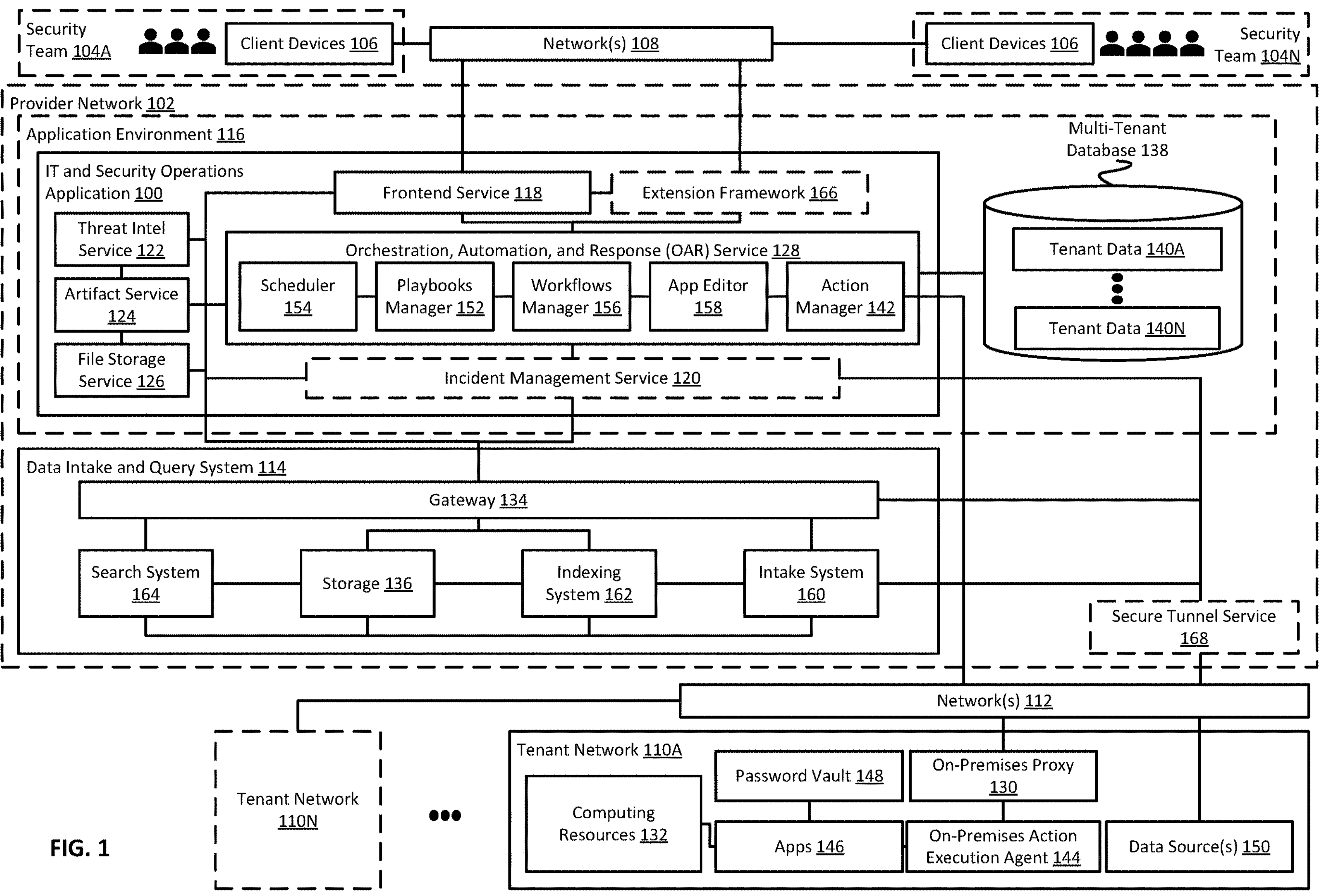
FIG. 1 is a block diagram of an example computing environment in which users can create, configure, and execute automation playbooks including capability blocks according to some examples.

The present disclosure relates to methods, apparatus, systems, and non-transitory computer-readable storage media for functionality used to aid in the development and use of playbooks for an information technology (IT) and security operations application and, more particularly, to a new "capability block" for playbooks. In some examples, a capability block enables playbook developers to create automations including generic actions (such as, e.g., a block Internet Protocol (IP) address action, a terminate virtual machine (VM) action, and the like) that are decoupled from certain assumptions about a computing environment in which the playbook is to be executed (e.g., assumptions about particular types of "apps" to be used to perform the actions, computing asset names and other configurations, among other possible environment-specific dependencies). Once a playbook containing one or more capability blocks is distributed to a user's computing environment, a user can use a visual playbook editor or other interface to configure the capability blocks for their environment. In some examples, the configuration of a capability block can include selecting an input playbook to implement the capability block. For example, an input playbook assigned to a capability block can include input and output parameters matching those specified by the capability block and can further include actions configured for a particular type of computing environment (e.g., including the use of one or more specific apps, computing asset configurations, and the like). Among other benefits, the use of capability blocks enables playbook developers to create playbooks that can be readily distributed across different types of computing environments by decoupling the implementation of certain types of automations from computing environment-specific apps and computing assets, thereby improving the overall security and operation of computing environments monitored by an IT and security operations application.

Some IT and security operations applications include features that enable users to create and use playbooks as part of their operations. Playbooks broadly represent a tool that security and IT operations teams can use to help develop and execute precise automation strategies within their IT environments. These automation strategies can include intelligence gathering tasks, actively mitigating the impact of ongoing incidents, among many other possible types of processes. To a define an automated workflow, an analyst can use a visual playbook editor or other interface provided by an IT and security operations application to link together a series of actions, some of which may be provided by "apps." An app, in this context, can include software that integrates an external application, computing device, or service with the IT and security operations application. For example, an app associated with an Internet Protocol (IP) intelligence service can be integrated to provide playbook actions related to geolocating IP addresses, an app related to an identity and access management (IAM) service can be integrated to enable playbook actions such as setting passwords or enabling/disabling users, and the like. Once a user creates and saves a playbook including a desired set of actions, the playbook can be executed manually by an analyst, e.g., while triaging or investigating cases, or playbooks can be configured to run automatically upon ingestion of certain types of events.

As indicated, a playbook typically includes a set of linked blocks defining a workflow, where some of the blocks represent actions to be performed by particular types of apps or against particular types of computing assets. However, in some cases, it may not be known what type of app or asset will be used for certain types of actions when a playbook is created, or it may not be desirable for a playbook creator to tie a playbook action to one type of app or other dependency. For example, a playbook developer might create a playbook including a "block IP" action, where the action can be performed by any number of different apps used across different computing environments (e.g., different apps associated with different types of network security applications, types of network devices, etc., each of which can perform a block IP action in certain environments). Today, such playbooks are typically created by selecting an app and other configurations that are assumed to be the most popular and assigning those to playbook actions. The use of the playbook in computing environments that do not conform to those assumptions then requires manual and error-prone reconfiguration of the playbook itself, where users are required to identify actions using incompatible apps or other settings, update the actions and configurations across the playbook, and test whether the updates operate as desired. These and other challenges often make it difficult for playbook developers to create playbooks that are readily usable across a wide variety of computing environments to which the playbook may otherwise be applicable.

To address these challenges, among others, the ability to add capability blocks to playbooks is provided. As indicated, these capability blocks enable playbook creators to add generic actions to a playbook that can implemented by an input playbook, or other mechanism conforming to a capability interface defined by a capability block, of a user's choice. An input playbook used to implement a capability block can include actions that are specific to a user's computing environment. Among other benefits, the capability blocks enable playbook authors to create playbooks without needing to make assumptions about the types of apps and other dependencies of a computing environment in which the playbook will execute. Playbook users can then more freely use playbooks against their own app toolchains, custom asset names and labels, and the like, thereby improving the ability to distribute and use playbooks across a wide range of computing environments.

FIG. 1 is a block diagram of an example computing environment including an IT and security operations application for which users can create, configure, and execute playbooks including capability blocks according to examples described herein. As shown in FIG. 1, an IT and security operations application 100 comprises software components executed by one or more electronic computing devices. In some examples, the computing devices are provided by a cloud provider network 102 (e.g., as part of a shared computing resource environment). In other examples, an IT and security operations application 100 executes on computing devices managed within an on-premises datacenter or other computing environment, or on computing devices located within a combination of cloud-based and on-premises computing environments.

The IT and security operations application 100 broadly enables users to perform security orchestration, automation, and response operations involving components of an organization's computing infrastructure (or components of multiple organizations' computing infrastructures). Among other benefits, an IT and security operations application 100 enables security teams and other users to automate repetitive tasks, to efficiently respond to security incidents and other operational issues, and to coordinate complex workflows across security teams and diverse IT environments. For example, users associated with various IT operations or security teams (sometimes referred to herein as "analysts," such as analysts that may be part of example one or more of security team 104A, . . . , security team 104N) can use client computing devices 106 to interact with the IT and security operations application 100 via one or more network(s) 108 to perform operations relative to IT environments for which they are responsible (such as, for example, one or more of tenant network 110A, . . . , tenant network 110N, which may be accessible over one or more network(s) 112, where network(s) 112 may be the same or different from network(s) 108). Although only two security teams are depicted in the example of FIG. 1, in general, any number of separate security teams can concurrently use the IT and security operations application 100 to manage any number of respective tenant networks, where each individual security team may be responsible for one or more tenant networks.

Users can interact with an IT and security operations application 100 and a data intake and query system 114 (described in more detail elsewhere herein) using client devices 106. The client devices 106 can communicate with the IT and security operations application 100 and with data intake and query system 114 in a variety of ways such as, for example, over an internet protocol via a web browser or other application, via a command line interface, via a software developer kit (SDK), and the like. In some examples, the client devices 106 can use one or more executable applications or programs from an application environment 116 to interface with the data intake and query system 114, such as the IT and security operations application 100. The application environment 116 can include, for example, tools, software modules (e.g., computer executable instructions to perform a particular function), etc., that enable application developers to create computer executable applications to interface with an IT and security operations application 100 and/or data intake and query system 114. The IT and security operations application 100, for example, can use aspects of the application environment 116 to interface with the data intake and query system 114 to obtain relevant data, process the data, and display it in a manner relevant to the IT operations and security context. As shown, the IT and security operations application 100 further includes additional backend services, middleware logic, front-end user interfaces, data stores, and other computing resources, and provides other facilities for ingesting use case specific data and interacting with that data, as described elsewhere herein.

As an example of using the application environment 116, the IT and security operations application 100 includes custom web-based interfaces (e.g., provided at least in part by a frontend service 118) that optionally rely on one or more user interface components and frameworks provided by the application environment 116. In some examples, an IT and security operations application 100 includes, for example, a "mission control" interface or set of interfaces. In this context, "mission control" refers to any type of interface or set of interfaces that broadly enable users to obtain information about their IT environments, to configure automated actions, playbooks, etc., and to perform operations related to IT and security infrastructure management. The IT and security operations application 100 further includes middleware business logic (including, for example, an optional incident management service 120, a threat intelligence service 122, an artifact service 124, a file storage service 126, and an orchestration, automation, and response (OAR) service 128) implemented on a middleware platform of the developer's choice. Furthermore, in some examples, an IT and security operations application 100 can be instantiated and executed in a different isolated execution environment relative to the data intake and query system 114. As a non-limiting example, in cases where the data intake and query system 114 is implemented at least in part in a Kubernetes cluster, the IT and security operations application 100 can execute in a different Kubernetes cluster (or other isolated execution environment system) and interact with the data intake and query system 114 via the gateway 134.

In examples where an IT and security operations application 100 is deployed in a tenant network, the application can instead be deployed as a virtual appliance at one or more computing devices managed by an organization using the IT and security operations application 100. A virtual appliance, for example, can include a VM image file that is pre-configured to run on a hypervisor or directly on the hardware of a computing device and that includes a pre-configured operating system upon which the IT and security operations application 100 executes. In other examples, the IT and security operations application 100 can be provided and installed using other types of standalone software installation packages or software package management systems. Depending on the implementation and user preference, an IT and security operations application 100 optionally can be configured on a standalone server or in a clustered configuration across multiple separate computing devices.

A user can initially configure an IT and security operations application 100 using a web-based console or other interface provided by the IT and security operations application 100 (for example, as provided by a frontend service 118 of the IT and security operations application 100). For example, users can use a web browser or other application to navigate to the IP address or hostname associated with the IT and security operations application 100 to access console interfaces, dashboards, and other interfaces used to interact with various aspects of the application. The initial configuration can include creating and configuring user accounts, configuring connection settings to one or more tenant networks (for example, including settings associated with one or more on-premises proxies 130 used to establish connections between on-premises networks and the IT and security operations application 100 running in a provider network 102 or elsewhere), and performing other optional configurations.

A user (also referred to herein as a "customer," "tenant," or "analyst") of an IT and security operations application 100 can create one or more user accounts to be used by a security team or other users associated with the user. A user of the IT and security operations application 100, for example, typically desires to use the application to manage one or more tenant networks for which the user is responsible (illustrated by example tenant networks 110A, . . . , 110N in FIG. 1). A tenant network can include any number of computing resources 132 operating as part of a corporate network or other networked computing environment with which a user is associated. Although the tenant networks 110A, . . . , 110N are shown as separate from the provider network 102 in FIG. 1, more generally, a tenant network can include components hosted in an on-premises network, in a provider network 102, or combinations of both (for example, as a hybrid cloud network).

In general, any of the computing resources 132 in a tenant network can potentially serve as a source of incident data to an IT and security operations application 100, a computing resource against which actions can be performed by the IT and security operations application 100, or both. The computing resources 132 can include various types of computing devices, software applications, and services including, but not limited to, a data intake and query system 114 (which itself can ingest and process machine data generated by other computing resources 132), a security information and event management (SIEM) system, a representational state transfer (REST) client that obtains or generates incident data based on the activity of other computing resources 132, software applications (including operating systems, databases, web servers, etc.), routers, intrusion detection systems and intrusion prevention systems (IDS/IDP), client devices (for example, servers, desktop computers, laptops, tablets, etc.), firewalls, and switches. The computing resources 132 can execute upon any number separate computing devices and systems within a tenant network.

During operation, data intake and query systems, SIEM systems, REST clients, and other system components of a tenant network obtain operational, performance, and security data from computing resources 132 in the network, analyze the data, and may identify potential IT and security-related incidents from time to time. A data intake and query system in a tenant network, for example, might identify potential IT-related incidents based on the execution of correlation searches against data ingested and indexed by the system, as described elsewhere herein. Other data sources 150 can obtain incident and security-related data using other processes. Once obtained, data indicating such incidents is sent to the data intake and query system 114 or IT and security operations application 100 via an on-premises proxy 130. For example, once a data intake and query system identifies a possible security threat or other IT-related incident based on data ingested by the data intake and query system, data representing the incident can be sent to the data intake and query system 114 via a REST API endpoint implemented by a gateway 134 or a similar gateway of the IT and security operations application 100. As mentioned elsewhere herein, a data intake and query system 114 or IT and security operations application 100 can ingest, index, and store data received from each tenant network in association with a corresponding tenant identifier such that each tenant's data is segregated from other tenant data (for example, when stored in common storage 136 of the data intake and query system 114 or in a multi-tenant database 138 of the IT and security operations application 100).

As mentioned, in some examples, some or all of the data ingested and created by an IT and security operations application 100 in association with a particular tenant is generally maintained separately from other tenants (for example, as illustrated by tenant data 140A, . . . , tenant data 140N in the multi-tenant database 138). In some examples, a tenant may further desire to keep data associated with two or more separate tenant networks segregated from one another. For example, a security team associated with a managed security service provider (MSSP) may be responsible for managing any number of separate tenant networks for various customers of the MSSP. As another example, a tenant corresponding to a business organization having large, separate departments or divisions may desire to logically isolate the data associated with each division. In such instances, a tenant can configure separate "departments" in the IT and security operations application 100, where each department is associated with a respective tenant network or other defined collection of data sources, computing resources, and so forth. Users and user teams can thus use this feature to manage multiple third-party entities or organizations using only a single login and permissions configuration for the IT and security operations application 100.

Once an IT and security operations application 100 obtains incident data, either directly from a tenant network or indirectly via a data intake and query system 114, the IT and security operations application 100 analyzes the incident data and enables users to investigate, determine possible remediation actions, and perform other operations. These actions can include default actions initiated and performed within a tenant network without direct interaction from user and can further include suggested actions provided to users associated with the relevant tenant networks. Once the suggested actions are determined, these actions can be presented in a "mission control" dashboard or other interface accessible to users of the IT and security operations application 100. Based on the suggested actions, a user can select one or more particular actions to be performed and the IT and security operations application 100 can carry out the selected actions within the corresponding tenant network. In the example of FIG. 1, an OAR service 128 of the IT and security operations application 100, which includes an action manager 142, can cause actions to be performed in a tenant network by sending action requests via network 112 to an on-premises proxy 130, which further interfaces with an on-premises action execution agent (for example, on-premises action execution agent 144 in tenant network 110A). In this example, the on-premises action execution agent 144 is implemented to receive action requests from an action manager 142 and to carry out requested actions against computing resources 132 using apps 146 (sometimes alternatively referred to as "connectors") and optionally a password vault 148 (e.g., to authenticate an app to one or more computing resources 132).

To execute actions against computing resources in tenant networks and elsewhere, in some examples, an IT and security operations application 100 uses a unified security language that includes commands usable across a variety of hardware and software products, applications, and services. To execute a command specified using the unified security language, in some examples, the IT and security operations application 100 (possibly via an on-premises action execution agent 144) uses one or more apps 146 to translate the commands into the one or more processes, languages, scripts, etc., necessary to implement the action at one or more particular computing resources 132. For example, a user might provide input requesting the IT and security operations application 100 to remove an identified malicious process from multiple computing systems in the tenant network 110A, where two or more of the computing systems are associated with different software configurations (for example, different operating systems or operating system versions). Accordingly, in some examples, the IT and security operations application 100 can send an action request to an on-premises action execution agent 144, which then uses one or more apps 146 to translate the command into the necessary processes to remove each instance of the malicious process on the varying computing systems within the tenant network (including the possible use of credentials and other information stored in the password vault 148).

In some examples, an IT and security operations application 100 includes a playbooks manager 152 that enables users to automate actions or series of actions by creating digital "playbooks" that can be executed by the IT and security operations application 100. At a high level, a playbook represents a customizable computer program that can be executed by an IT and security operations application 100 to automate a wide variety of possible operations related to an IT environment. These operations—such as quarantining devices, modifying firewall settings, restarting servers, and so forth—are typically performed by various security products by abstracting product capabilities using an integrated "app model." Additional details related to operation of the IT and security operations application 100 and use of digital playbooks are provided elsewhere herein.

In some examples, an IT and security operations application 100 can support both automation playbooks and input playbooks. An automation playbook can be created and used, for example, to run automatically based on triggers. In some examples, an input playbook accepts configured inputs to run, provides configured outputs, and can be used as a sub-playbook of another automation or input playbook. In other examples, any type of playbook can be used as an automation playbook or input playbook (e.g., an IT and security operations application 100 need not make a distinction between the two).

As mentioned, an IT and security operations application 100 may be implemented as a collection of interworking services that each carry out various functionality as described herein. In the example shown in FIG. 1, the IT and security operations application 100 includes an incident management service 120, a frontend service 118, an artifact service 124, a threat intelligence service 122, a file storage service 126, and an orchestration, automation, and response (OAR) service 128. The set of services comprising the IT and security operations application 100 in FIG. 1 are provided for illustrative purposes only; in other examples, an IT and security operations application 100 can be comprised of more or fewer services and each service may implement the functionality of one or more of the services shown.

In some examples, an incident management service 120 is responsible for obtaining incidents or events (sometimes also referred to as "notables"), either directly from various data sources 150 in tenant networks or directly based on data ingested by the data intake and query system 114 via the gateway 134. The frontend service 118 provides user interfaces to users of the application, among other processes described herein. Using these user interfaces, users of the IT and security operations application 100 can perform various application-related operations, view displays of incident-related information, and can configure administrative settings, license management, content management settings, and so forth. In some examples, an artifact service 124 manages artifacts associated with incidents received by the application, where incident artifacts can include information such as IP addresses, usernames, file hashes, and so forth. In some examples, a threat intelligence service 122 obtains data from external or internal sources to enable other services to perform various incident data enrichment operations. As one non-limiting example, if an incident is associated with a file hash, a threat intelligence service 122 can be used to correlate the file hash with external threat feeds to determine whether the file hash has been previously identified as malicious. In some examples, a file storage service 126 enables other services to store incident-related files, such as email attachments, files, and so forth. In some examples, an OAR service 128 performs a wide range of OAR capabilities such as action execution (via an action manager 142), playbook execution (via a playbooks manager 152), scheduling work to be performed (via a scheduler 154), user approvals and so forth as workflows (via a workflows manager 156), among other functionality described herein. According to examples described herein, an OAR service 128 includes an app editor 158 that enables users to create, modify, and test apps (e.g., including apps 146 utilized within a local tenant network, apps used by an IT and security operations application 100 running in a provider network 102, or used elsewhere) using the built-in app editor, as described in more detail herein.

The operation of an IT and security operations application 100 generally begins with the ingestion of data related to various types of incidents involving computing resources of various tenant networks (for example, computing resources 132 or other data sources 150 of a tenant network 110A). In some examples, users configure an IT and security operations application 100 to obtain, or "ingest," data from one or more defined data sources 150, where such data sources can be any type of computing device, application, or service that supplies information that users may want to store or act upon, and where such data sources may include one or more of the computing resources 132 or data sources which generate data based on the activity of one or more computing resources 132. As mentioned, examples of data sources include, but are not limited to, a data intake and query system such as the SPLUNK® ENTERPRISE system, a SIEM system, a REST client, applications, routers, intrusion detection systems (IDS)/intrusion prevention systems (IDP) systems, client devices, firewalls, switches, or any other source of data identifying potential incidents in tenants' IT environments. Some of these data sources may themselves collect and process data from various other data generating components such as, for example, web servers, application servers, databases, firewalls, routers, operating systems, and software applications that execute on computer systems, mobile devices, sensors, Internet of Things (IoT) devices, etc. The data generated by the various data sources can be represented in any of a variety of data formats.

In some examples, data can be sent from tenant networks to an IT and security operations application 100 using any of several different mechanisms. As one example, data can be sent to data intake and query system 114, processed by an intake system 160 (e.g., including indexing of resulting event data by an indexing system 162, thereby further causing the event data to be accessible to a search system 164), and obtained by an incident management service 120 of the IT and security operations application 100 via a gateway 134. As another example, components can send data from a tenant network directly to the incident management service 120, for example, via a REST endpoint.

In some examples, data ingested by an IT and security operations application 100 from configured data sources 150 can be represented in the IT and security operations application 100 by data structures referred to as "incidents, "events," "notables," or "containers". Here, an incident or event is a structured data representation of data ingested from a data source and that can be used throughout the IT and security operations application 100. In some examples, an IT and security operations application 100 can be configured to create and recognize different types of incidents depending on the corresponding type of data ingested, such as "IT incidents" for IT operations-related incidents, "security incidents" for security-related incidents, and so forth. An incident can further include any number of associated events and "artifacts," where each event or artifact represents an item of data associated with the incident. As a non-limiting example, an incident used to represent data ingested from an anti-virus service and representing a security-related incident might include an event indicating the occurrence of the incident and associated artifacts indicating a name of the virus, a hash value of a file associated with the virus, a file path on the infected endpoint, and so forth.

An incident of an IT and security operations application 100 can be associated with a status or state that may change over time. Analysts and other users can use this status information, for example, to indicate to other analysts which incidents an analyst is actively investigating, which incidents have been closed or resolved, which incidents are awaiting input or action, and the like. Furthermore, an IT and security operations application 100 can use the transitions of incidents from one status to another to generate various metrics related to analyst efficiency and other measurements of analyst teams. For example, the IT and security operations application 100 can be configured with a number of default statuses, such as "new" or "unknown" to indicate incidents that have not yet been analyzed, "in progress" for incidents that have been assigned to an analyst and are under investigation, "pending" for incidents that are waiting input or action from an analyst, and "resolved" for incidents that have been addressed by an assigned analyst. An amount of time that elapses between these statuses for a given incident can be used to calculate various measures of analyst and analyst team efficiency, such as measurements of a mean time to resolve incidents, a mean time to respond to incidents, a mean time to detect an incident that is a "true positive," a mean dwell time reflecting an amount of time taken to identify and remove threats from an IT environment, among other possible measures. Analyst teams can also create custom statuses to indicate incident states that may be more specific to the way the particular analyst team operates, and further create custom efficiency measurements based on such custom statuses.

In some examples, an IT and security operations application 100 also generates and stores data related to its operation and activity conducted by tenant users including, for example, playbook data, workbook data, user account settings, configuration data, and historical data (such as, for example, data indicating actions taken by users relative to particular incidents or artifacts, data indicating responses from computing resources based on action executions, and so forth), in one or more multi-tenant databases 138. In other examples, some or all the data above is stored in storage managed by the data intake and query system 114 and accessed via the gateway 134. These multi-tenant database (s) 138 can operate on a same computer system as the IT and security operations application 100 or at one or more separate database instances. As mentioned, in some examples, the storage of such data by the data intake and query system 114 and IT and security operations application 100 for each tenant is generally segregated from data associated with other tenants based on tenant identifiers stored with the data or other access control mechanisms.

An IT and security operations application 100 can define and implement many different types of "actions," which represent high-level, vendor- and product-agnostic primitives that can be used throughout the IT and security operations application 100. Actions generally represent simple and user-friendly verbs that are used to execute actions in playbooks or manually through other user interfaces of the IT and security operations application 100, where such actions can be performed against one or more computing resources in an IT environment. In many cases, a same action defined by the IT and security operations application 100 can be carried out on computing resources associated with different vendors or configurations via action translation processes performed by apps of the platform, as described in more detail elsewhere herein. Examples of actions that can be defined by an IT and security operations application 100 include a "get process dump" action, a "block IP address" action, a "suspend VM" action, a "terminate process" action, and so forth.

In some examples, an IT and security operations application 100 enables connectivity with various IT computing resources in a provider network 102 and in tenant networks 110A, . . . , 110N, including IT computing resources from a wide variety of third-party IT and security technologies, and further enables the ability to execute actions against those computing resources via apps (such as the apps 146 in tenant network 110A and apps implemented as part of the IT and security operations application 100). In general, an app 146 represents program code that provides an abstraction layer (for example, via one or more libraries, APIs, or other interfaces) to one or more of hundreds of possible IT and security-related products and services and which exposes lists of actions supported by those products and services. Each app 146 can also define which types of computing resources that the app can operate on, an entity that created the app, among other information.

As one example, an IT and security operations application 100 can be configured with an app 146 that enables the application 100 to communicate with a VM product provided by a third-party vendor. In this example, the app for the VM product enables the IT and security operations application 100 to take actions relative to VM instances within a user's IT environment, including starting and stopping the VMs, taking VM snapshots, analyzing snapshots, and so forth. To enable the app 146 to communicate with a VM manager or with individual VM instances, the app 146 can be configured with login credentials, hostnames or IP addresses, and so forth, for each instance with which communication is desired (or the app may be configured to obtain such information from a password vault 148). Other apps 146 can be created and made available for VM products from other third-party vendors, where those apps may be configured to translate some or all the same actions that are available with respect to the first type of VM product. In general, apps 146 enable interaction with virtually any type of computing resource 132 in an IT environment and can be added and updated over time to support new types of computing resources. Additional details related to the creation and modification of apps is described elsewhere herein.

In some examples, computing resources 132 can include physical or virtual components within an organization with which an IT and security operations application 100 communicates (for example, via apps as described above). Examples of computing resources 132 include, but are not limited to, servers, endpoint devices, applications, services, routers, and firewalls. A computing resource 132 can be represented in an IT and security operations application 100 by data identifying the computing resource, including information used to communicate with the device or service such as, for example, an IP address, automation service account, username, password, etc. In some examples, one or more computing resources 132 can be configured as a source of incident information that is ingested by an IT and security operations application 100. The types of computing resources 132 that can be configured in the IT and security operations application 100 may be determined in some cases based on which apps 146 are installed for a particular user. In some examples, automated actions can be configured with respect to various computing resources 132 using playbooks, described in more detail elsewhere herein. Each computing resource 132 may be hosted in an on-premises tenant network, a cloud-based provider network, or any other network or combination thereof.

The operation of an IT and security operations application 100 can include the ability to create and execute customizable playbooks. At a high level, a playbook comprises computer program code and possibly other data that can be executed by an IT and security operations application 100 to carry out an automated set of actions (for example, as managed by a playbooks manager 152 as part of the OAR service 128). In some examples, a playbook is comprised of one or more functions, or codeblocks or function blocks, where each function contains program code that performs defined functionality when the function is encountered during execution of the playbook of which it is a part. As an example, a first function block of a playbook might implement an action that upon execution affects one or more computing resources 132 (e.g., by configuring a network setting, restarting a server, etc.); another function block might filter data generated by the first function block in some manner; yet another function block might obtain information from an external service, and so forth. A playbook is further associated with a control flow that defines an order in which the IT and security operations application 100 executes the function blocks of the playbook, where a control flow may vary at each execution of a playbook depending on particular input conditions (e.g., where the input conditions may derive from attributes associated with an incident triggering execution of the playbook or based on other accessible values).

In some examples, the IT and security operations application 100 described herein provides a visual playbook editor (for example, as an interface provided by a frontend service 118) that allows users to visually create and modify playbooks. Using a visual playbook editor GUI, for example, users can codify a playbook by creating and manipulating a displayed graph including nodes and edges, where each of the nodes in the graph represents one or more function blocks that each perform one or more defined operations during execution of the playbook, and where the edges represent a control flow among the playbook's function blocks. In this manner, users can craft playbooks that perform complex sequences of operations without having to write some or any of the underlying code. The visual playbook editor interfaces further enable users to supplement or modify the automatically generated code by editing the code associated with a visually designed playbook, as desired.

An IT and security operations application 100 can provide one or more playbook management interfaces that enable users to locate and organize playbooks associated with a user's account. A playbook management interface can display a list of playbooks that are associated with a user's account and further provide information about each playbook such as, for example, a name of the playbook, a description of the playbook's operation, a number of times the playbook has been executed, a last time the playbook was executed, a last time the playbook was updated, tags or labels associated with the playbook, a repository at which the playbook and the associated program code is stored, a status of the playbook, and the like.

Users can create a new digital playbook starting from a playbook management interface or using another interface provided by the IT and security operations application 100. Using a playbook management interface, for example, a user can select a "create new playbook" interface element and the IT and security operations application 100 causes display of a visual playbook editor interface including a graphical canvas on which users can add nodes representing operations to be performed during execution of the playbook, where the operations are implemented by associated source code that can be automatically generated by the visual playbook editor, and add connections or edges among the nodes defining an order in which the represented operations are to be performed upon execution.

In some examples, the creation of a graph representing a playbook includes the creation of connections between function blocks, where the connections are represented by edges that visually connect the nodes of the graph representing the collection of function blocks. These connections among the playbook function blocks indicate a program flow for the playbook, defining an order in which the operations specified by the playbook blocks are to occur. For example, if a user creates a connection that links the output of a block A to the input of a block B, then block A executes to completion before execution of block B begins during execution of the playbook. In this manner, output variables generated by the execution of block A can be used by block B (and any other subsequently executed blocks) during playbook execution.

Once a user has codified a playbook using a visual playbook editor or other interface, the playbook can be saved (for example, in a multi-tenant database 138 and in association with one or more user accounts) and run by the IT and security operations application 100 on-demand. As illustrated in the example playbooks above, a playbook includes a "start" block that is associated with source code that begins execution of the playbook. More particularly, the IT and security operations application 100 executes the function represented by the start block for a playbook with container context comprising data about the incident against which the playbook is executed, where the container context may be derived from input data from one or more configured data sources. A playbook can be executed manually in response to a user providing input requesting execution of the playbook, or playbooks can be executed automatically in response to the IT and security operations application 100 obtaining input events matching certain criteria. In examples where the source code associated with a playbook is based on an interpreted programming language (for example, such as the Python programming language), the IT and security operations application 100 can execute the source code represented by the playbook using an interpreter and without compiling the source code into compiled code. In other examples, the source code associated with a playbook can first be compiled into byte code or machine code the execution of which can be invoked by the IT and security operations application 100.

In some examples, an optional IT and security operations application extension framework 166 allows users to extend the user interfaces, data content, and functionality of an IT and security operations application 100 in various ways to enhance and enrich users' workflow and investigative experiences. Example types of extensions enabled by the extension framework 166 include modifying or supplementing GUI elements (including, e.g., tabs, menu items, tables, dashboards, visualizations, etc.) and other components (including, e.g., response templates, connectors, playbooks, etc.), where users can implement these extensions at predefined extension points of the IT and security operations application 100. In some examples, the extension framework 166 further includes a data integration system that provides users with mechanisms to integrate data from external applications, services, or other data sources into their plugins (e.g., to visualize data from any external data source in the IT and security operations application 100 or to otherwise enhance users' investigative experience with data originating outside of the IT and security operations application or data intake and query system 114).

The types of users that might be interested in creating plugins using an IT and security operations application extension framework 166 include, for example, development teams associated with a data intake and query system 114, developers of third-party applications or services relevant to the IT and security operations application 100 (e.g., developers of VM management software, cloud computing resource management software, etc.), and other general users of the IT and security operations application 100. Users of the IT and security operations application 100 might, for example, desire to enhance their own workflows and other processes by enabling internal user information lookups, creating internal ticketing system postings, or enabling any other desired visualizations or actions at various points in the IT and security operations application. In some examples, the extension framework 166 enables users to create plugins using "No-Code" development tools, e.g., where users can define the specifications for custom visualizations, data integrations, and other plugin components without direct user coding (e.g., without the direct creation of JavaScript code, JSON specifications, or other data comprising a plugin), although users can also modify the underlying plugin components as desired.

As one example use case for a plugin, consider a cybersecurity company that provides security software that is known to be used by users of the IT and security operations application 100. In this example, developers of the security software might desire for certain information collected or generated by the security software to be visible at various points within the IT and security operations application 100, e.g., to create a tighter integration of the two software applications. The developers, for example, might desire for users of the IT and security operations application 100 to be able to view endpoint information, malware information, etc., collected by the security application when users view various visualizations or other incident information in the IT and security operations application 100 that is associated with the data collected by the security software.

In the example above, developers associated with the cybersecurity company can use the extension framework 166 to create a plugin that integrates the data collected by the security application with the IT and security operations application 100. Users who subscribe to the plugin can then view relevant data or perform other actions when the users navigate to defined extension points of the IT and security operations application 100. Numerous other such use cases exist for a wide variety of applications, data sources, and desired functionality related to an IT and security operations application 100. Among other benefits, the ability to create and use plugins to an IT and security operations application 100 enables security teams to efficiently investigate and remediate a wide variety of incidents that occur from time to time in IT environments, thereby improving the overall security and operation of the IT environments.

In some examples, components external to the IT and security operations application 100 interface with an intermediary secure tunnel service 168 to send communications to, and to receive communications from, an IT and security operations application 100 running in a provider network 102. In some examples, the secure tunnel service 168 operates as a service that establishes WebSocket or other types of secure connections to endpoint devices. As one example, the secure tunnel service 168 can establish a first secure connection to the IT and security operations application 100 and a second secure connection to an on-premises proxy 130 and an on-premises action execution agent 144 executing in a tenant network 110A, where each connection is established using a handshake technique with the respective endpoints. Once established, the connection enables two-way communications between the IT and security operations application 100 (e.g., via a separate proxy implemented by the IT and security operations application 100) and the on-premises action execution agent 144 without the need to open a port in a firewall or perform other configurations to a network associated with the tenant network 110A. In some examples, the secure tunnel service 168 is a cloud-based service (e.g., executing using computing resources provided by a provider network 102) configured to transfer data between an IT and security operations application 100 and computing devices located on networks external to the provider network 102, including on-premises action execution agents, mobile devices, and the like. In other examples, the secure tunnel service 168 executes using computing resources located outside of a cloud-based environment.

In some examples, the secure tunnel service 168 performs authentication operations with other components (e.g., the IT and security operations application 100 and an on-premises proxy 130 or on-premises action execution agent 144) to establish trust and then establishes secure communications channels with those components, where the secure tunnel service 168 and other components transmit secure communications using the secure communications channels. In some examples, the secure tunnel service 168 provides end-to-end encryption (E2EE) of communications between the IT and security operations application 100 and an on-premises action execution agent 144 via an on-premises proxy 130 by transmitting one or more encrypted data packets between the IT and security operations application 100 and the on-premises proxy 130. In some examples, communications sent through the secure tunnel service 168 are in the form of data packets, where each data packet includes, for example, a payload and a device identifier for a destination device that is to receive the data packet. In other examples, the data packet can also include a device identifier for the source device or an instance identifier that indicates an IT and security operations application instance associated with the data packet. In some examples, the data packet is encrypted prior to being transmitted to the secure tunnel service 168, e.g., using a public key of an asymmetric key pair generated by a receiving device. While in some examples, the secure tunnel service 168 decrypts the data packet before sending the data packet to its intended destination, in other examples, the secure tunnel service 168 forwards the encrypted data packet to its intended destination without performing a decryption process.

The IT and security operations application 100 and on-premises proxy 130 can communicate with the secure tunnel service 168 across network(s) 112. As indicated herein, the networks 112 can be communications networks, such as a local area network (LAN), wide area network (WAN), cellular network (e.g., LTE, HSPA, 3G, 4G, and/or any other network based on cellular technologies), and/or networks using any of wired, wireless, terrestrial microwave, or satellite links. In some examples, after an on-premises action execution agent 144 is installed and executed within a tenant network 110A, the on-premises action execution agent 144 uses an on-premises proxy 130 to initiate a process to establish a secure connection (e.g., a gRPC Remote Procedure Calls (gRPC) over HTTP/2 connection) with a secure tunnel service 168. For example, the secure tunnel service 168 may establish the secure connection and associate the secure connection with a device identifier for the on-premises proxy 130.

In some examples, the secure tunnel service 168 maintains a database that stores document data structures and optionally stores keys. This database, for example, can be a structure query language (SQL) database, or a NoSQL database, such as an AMAZON® DynamoDB. In some examples, the database includes a key store that stores encryption keys, including single-use session keys and long-term keys associated with devices that send E2EE communications. In other examples, the secure tunnel service 168 does not store encryption keys and routes messages without the use of a key store. In some examples, the database also includes a routing table that includes address information associated with devices registered with the secure tunnel service 168 with which the service has established secure communications. The secure tunnel service 168, for example, can send queries to the database to determine, based on a device identifier in a particular data packet, the address of the intended recipient of the particular data packet.

As illustrated in FIG. 1, the secure tunnel service 168 may not directly communicate with an on-premises action execution agent 144 but communicate instead through an on-premises proxy 130. As indicated herein, the on-premises proxy 130 is a process executing in the tenant network 110A and that operates as a gateway between the secure tunnel service 168 and the IT and security operations application 100. The on-premises proxy 130 is configured to receive messages from the secure tunnel service 168 and forward the messages to the on-premises action execution agent 144 for processing. The on-premises proxy 130 can also be configured to generate and send messages (e.g., notifications, alerts, etc.) IT and security operations application 100 via the secure tunnel service 168. In some examples, the on-premises proxy 130 can also send messages to configured mobile devices in accordance with a push notification service, such as the APPLE® Push Notification service (APN), or GOOGLE® Cloud Messaging (GCM). In some examples, the on-premises proxy 130 is configured to perform the management, generation, and registration of encryption keys used to communicate with the secure tunnel service 168.

In some examples, an IT and security operations application 100 provides playbook design features that enable users to create and configure playbooks including capability blocks. As described in more detail herein, a capability block broadly represents a generic action that is decoupled from any specific implementation of the action, e.g., implementations based on specific apps, computing assets and computing asset configurations, custom labels, etc. To use a playbook including one or more capability blocks, a user can provide implementations for the one or more capability blocks that are applicable to the computing environment in which the user intends to execute the playbook. In this manner, a playbook developer can create playbooks that can be readily used in a wider range of computing environments compared to those playbooks that include actions that hard-coded with assumptions about the components in those computing environments.

Figure 2:
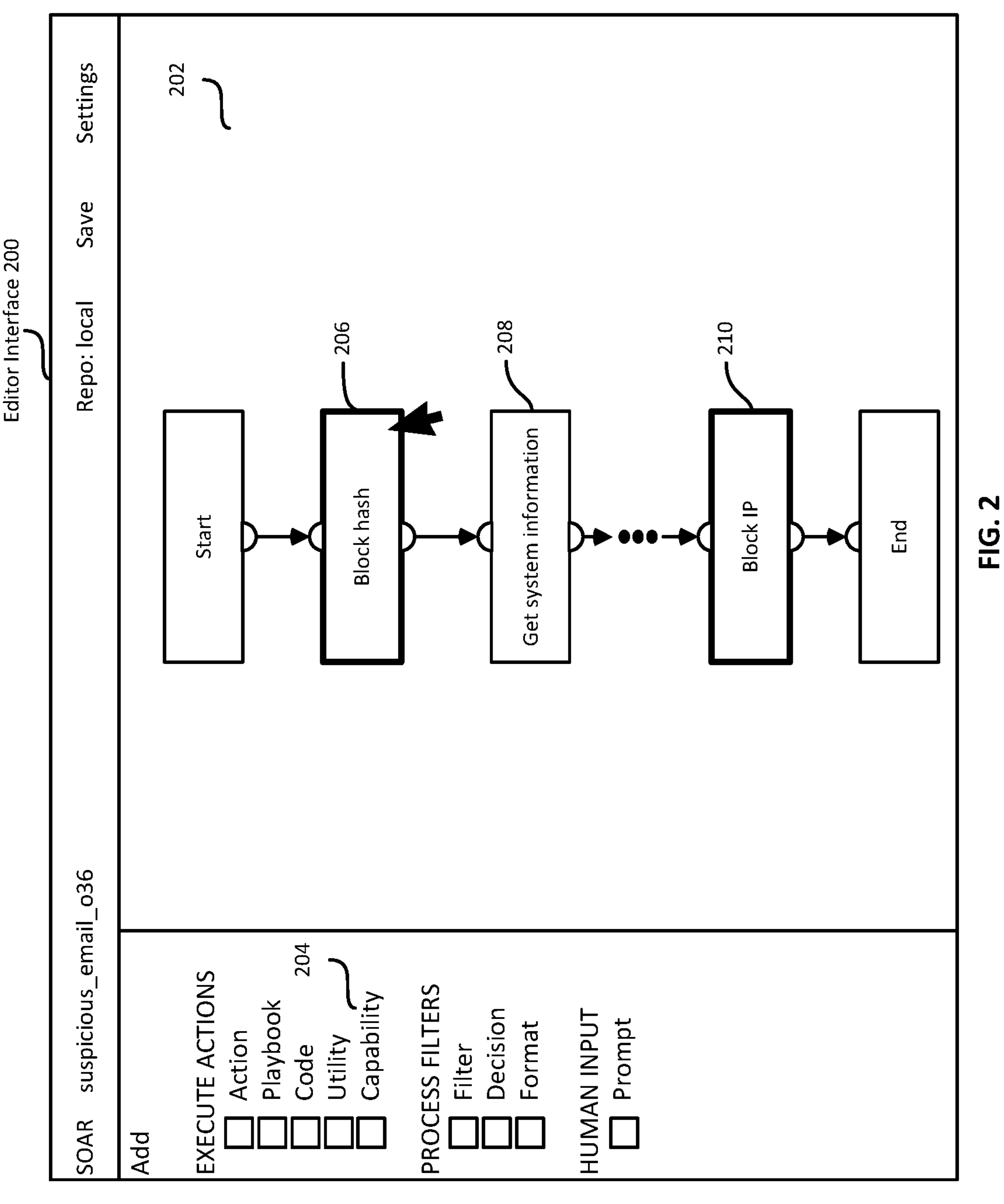
FIG. 2 illustrates an example graphical user interface (GUI) including a visual playbook editor in which users can add capability blocks to an automation playbook according to some examples.

FIG. 2 illustrates an example graphical user interface (GUI) including a visual playbook editor in which users can add capability blocks to an automation playbook according to some examples. For example, the visual playbook editor interface 200 includes a canvas 202 in which a user can add and configure the blocks of an automation playbook under development. In this example, a user has used a block panel to select a capability block option 204 indicating a desire to add one or more capability blocks, added capability block 206 and capability block 210 to the canvas 202, and configured connections between the capability blocks and other blocks in the playbook (e.g., the capability block 206 is connected to an action block 208 used to perform other types of actions). Although the example in FIG. 2 illustrates a playbook including only a relatively small number of blocks, in other examples, a playbook can include any number of blocks to carry out a desired automation. In this example, a user might desire to use the capability blocks to design a generic automation that can be applied in computing environments using different apps and computing assets, e.g., different apps and computing assets to carry out "block hash" and "block IP" actions represented by capability block 206 and capability block 210, respectively.

Figure 3:
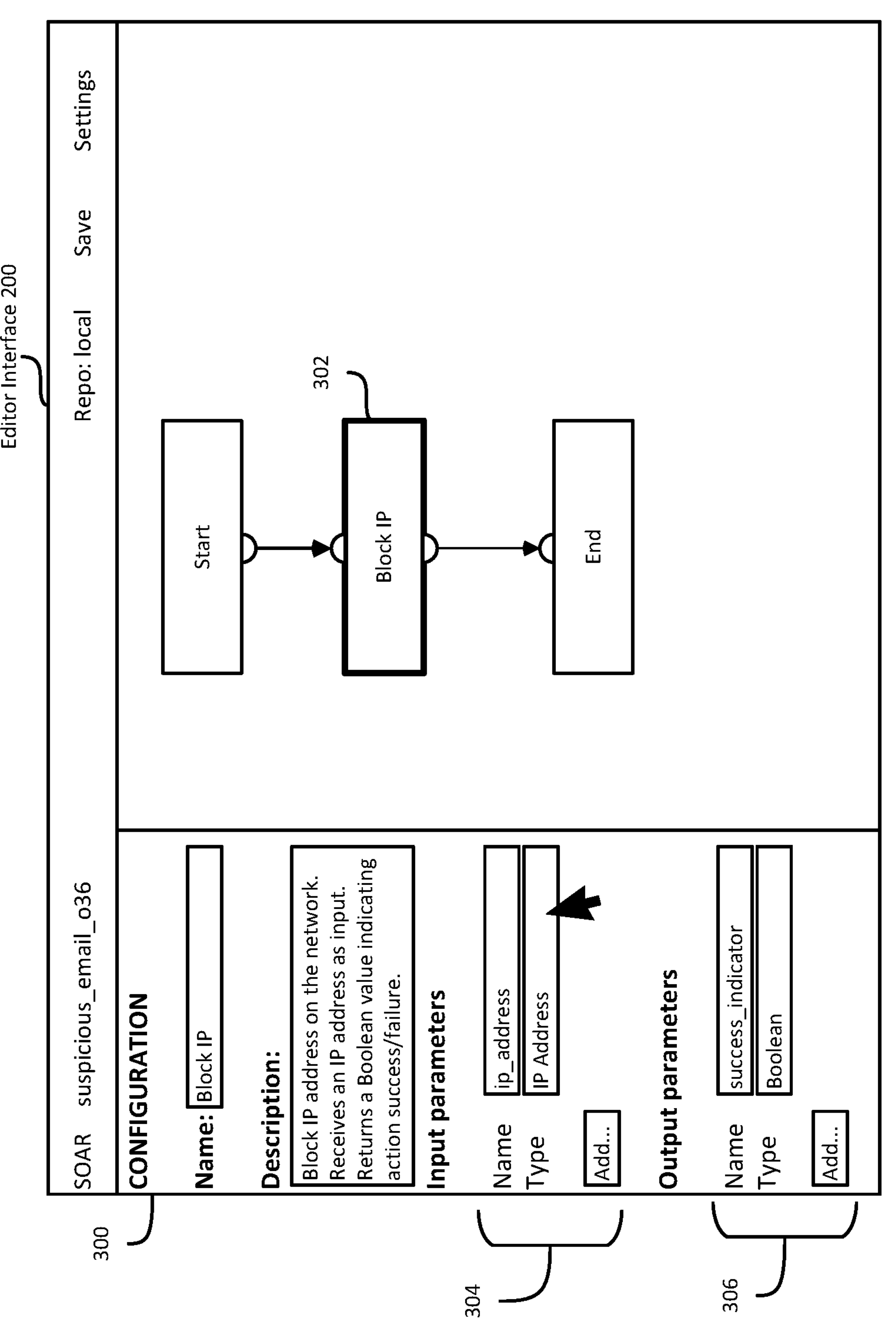
FIG. 3 illustrates an example configuration panel of a visual playbook editor that users can use to configure a parameter specification indicating input parameters and output parameters associated with a capability block, among other possible configurations, according to some examples.

In some examples, a user can use a visual playbook editor or other interface to configure settings associated with a capability block added to an automation playbook. FIG. 3 illustrates an example configuration panel of a visual playbook editor used to configure settings associated with a capability block according to some examples. In FIG. 3, the visual playbook editor interface 200 displays a configuration panel 300 (e.g., responsive to a user adding the capability block 302 or otherwise selecting the capability block 302 in the canvas). As shown, the example configuration settings for the capability block 302 enable users to create a parameter specification indicating a set of one or more input parameters and one or more output parameters to be associated with the capability block 302.

For example, using the interface elements 304, a user can add one or more input parameters to the capability block 302, where each input parameter can be associated with a parameter name and a data type (e.g., IP address, file hash, Boolean value, etc.). As indicated, these input parameters correspond to the values that a playbook developer expects to be used as input to any input playbook used to implement the capability block 302. For example, in the case of a capability block corresponding to a "block IP" action, the playbook developer might expect that an IP address is provided as input. Thus, an upstream component of the playbook in which the capability block is placed can provide an IP address as output, or an IP address value can be obtained from an event triggering execution of the playbook of which the capability block is a part. Similarly, a user can use interface elements 306 to add one or more output parameters to the capability block 302, each corresponding to an expected output value to be generated by an implementation of the capability block 302. An implementing input playbook is thus expected to generate output values matching the specified types of output parameters, and these values can be used by any downstream playbook components configured to receive those values as input.

In some examples, a user can indicate that one or more of the input parameters, output parameters, or both, are required parameters, while other parameters can be indicated as optional. The capability block can optionally be associated with other configurations such as, e.g., expected labels associated with matching events or input playbooks, notes indicating what tasks the capability block is expected to perform, etc. As illustrated in FIG. 3, the capability block 302 indicates that is it associated with an action of blocking an IP address, but the capability block is not associated with any specific app or action provided by the IT and security operations application. The capability block 302 instead serves as a generic representation of the action to be implemented by a separate input playbook or other mechanism and can be distributed and readily used in any environment in which an implementation for the capability block can be provided.

Figure 4:
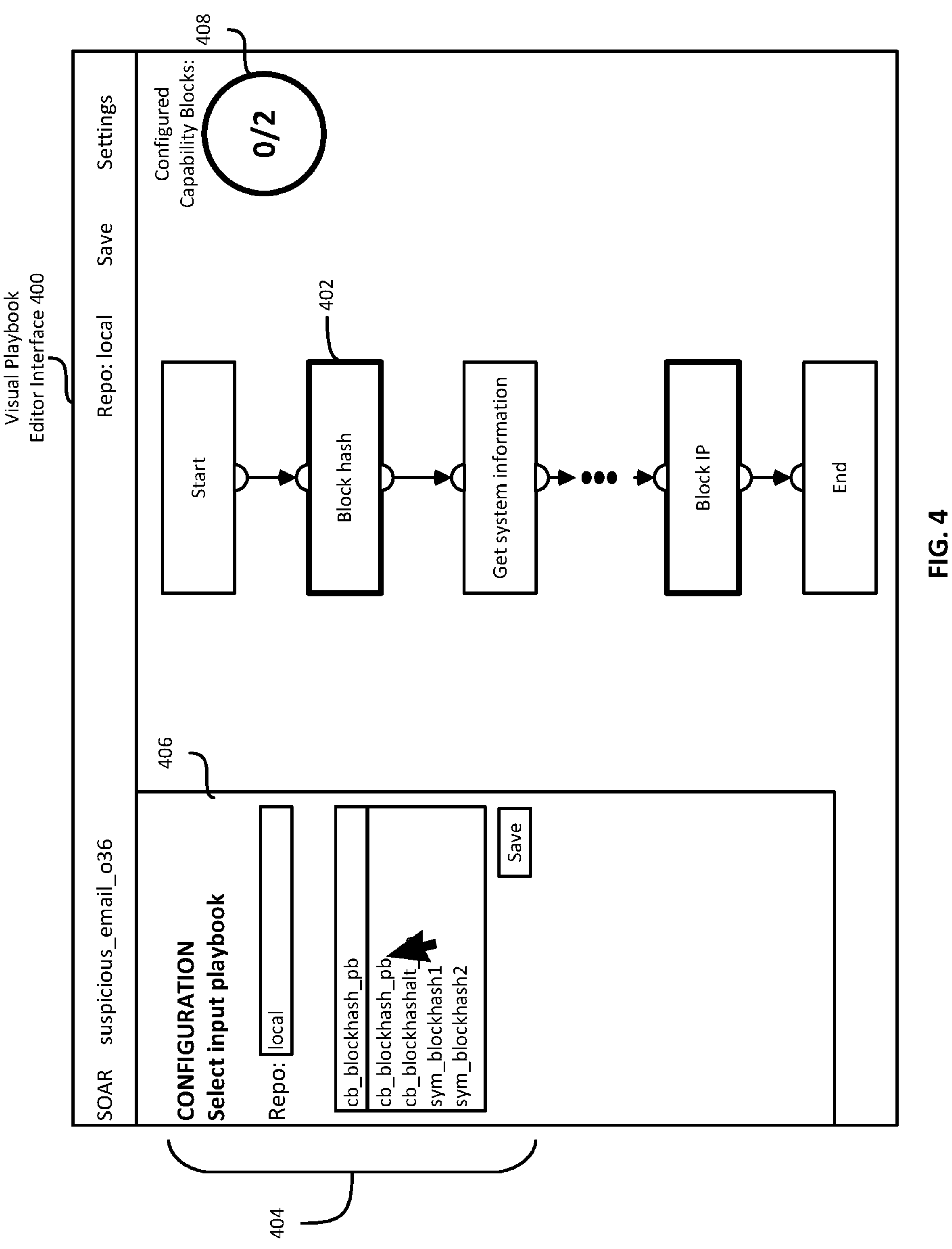
FIG. 4 illustrates the display, in a visual playbook editor interface, of an automation playbook including multiple capability blocks and further indicating a number of capability blocks pending implementation by an input playbook according to some examples.

FIG. 4 illustrates the display, in a visual playbook editor interface, of an automation playbook including multiple capability blocks and further indicating capability blocks pending implementation according to some examples. In this example, a user may have created or otherwise obtained an automation playbook including one or more capability blocks and further intends to use the automation playbook in a specific computing environment. In this example, a user can use a visual playbook editor interface 400 to configure an implementation for each of the capability blocks in the playbook so that the automation playbook can be executed by an IT and security operations application 100. In some examples, the configuration of a capability block (e.g., capability block 402) for use in one or more specific computing environments can include providing input selecting an input playbook to assign to the capability block, where the input playbook accepts as input the one or more parameters associated with the capability block and, upon execution, generates the one or more output parameters associated with the capability block. For example, a user can create or otherwise obtain an input playbook that performs the action associated with the capability block based on the expected input values and generates the expected output values. The input playbook selected to implement a capability block can include actions provided by apps and other components that are specific to one or more types of third-party services used in a computing environment, types of computing assets present in the computing environment, among other computing environment-specific characteristics.

In FIG. 4, for example, a user can use interface elements 404 of a configuration panel 406 to select an input playbook to be used to implement a selected capability block 402. As shown, the interface elements 404 can enable a user to identify one or more repositories storing input playbooks from which an implementing playbook can be selected and can further enable a user to select a particular input playbook to assign to the capability block. In some examples, users can provide additional configurations such as, for example, a mapping of input and output parameters of the input playbook to the input and output parameter specification for the capability block 402, among other possible customizations. The visual playbook editor interface 400 further includes a graphical indication 408 indicating a total number of capability blocks present in the playbook and further indicating the number of capability blocks pending implementation (e.g., pending selection of an implementing input playbook).

In some examples, the IT and security operations application 100 can identify recommended input playbooks for implementing a capability block present in an automation playbook and further cause display of the recommended input playbooks in a visual playbook editor. For example, the IT and security operations application 100 can identify a recommended input playbook for implementing a capability block by matching a parameter specification of the input playbook (e.g., types of expected input and output parameters) to the parameter specification for the capability block. The IT and security operations application 100 can optionally use other characteristics to identify candidate input playbooks such as, for example, matching a name of the capability block to a name of a recommended input playbook, using input playbooks labels, using information about a local computing environment configuration, and the like. The IT and security operations application 100 can identify the candidate input playbooks from one or more repositories identified by a user or from one or more default repositories (e.g., local repositories, community repositories, etc.). Once displayed a visual playbook editor, a user can select one of the recommended input playbooks to assign the input playbook to the capability block for implementation. In other examples, users can register input playbooks as being associated with certain types of capabilities (e.g., as configured as part of the playbook using a standardized namespace) and the IT and security operations application can identify suggested input playbooks by locating input playbooks registered to certain capability types.

In some examples, once the capability block(s) of an automation playbook have been assigned implementing input playbooks, an IT and security operations application 100 can execute the automation playbook (e.g., responsive to a manual execution request from a user or executed automatically responsive to a triggering event). The execution of an automation playbook including one or more capability blocks can include, upon reaching a capability block in the playbook, invoking execution of the input playbook by the IT and security operations application 100. For example, an IT and security operations application 100 can invoke an implementing input playbook by providing as input to the input playbook one or more input parameter values, monitoring execution of the input playbook, obtaining one or more output values corresponding to those included in an output parameter specification for the capability block, and providing the one or more output values to one or more downstream components of the automation playbook. As indicated, an input playbook used to implement a capability block can include the execution of one or more actions provided by one or more specific apps and app configurations of the IT and security operations application, wherein an app can be configured to interface with a third-party application, service, or computing device.

Figure 5:
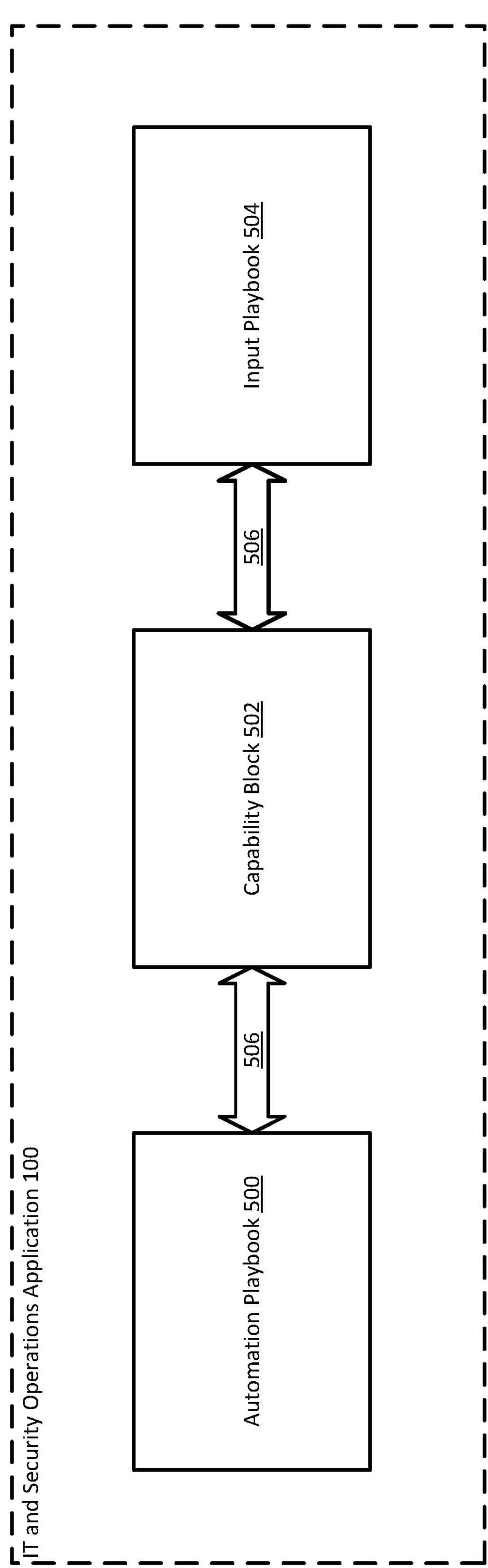
FIG. 5 illustrates an example interface relationship between an automation playbook, a capability block, and an input playbook used to implement a capability block according to some examples.

FIG. 5 illustrates an example interface relationship between an automation playbook, a capability block, and an input playbook used to implement a capability block. As indicated, an automation playbook (e.g., an automation playbook 500) can include a capability block (e.g., a capability block 502) that can be assigned an implementing input playbook (e.g., an input playbook 504) for execution. As illustrated in FIG. 5, a capability block 502 can define an input and output parameter specification 506 that is used by an automation playbook 500, e.g., to link the capability block 502 to one or more other components of the automation playbook. This input and output parameter specification 506 further defines an interface between the capability block 502 and an implementing input playbook 504, where the input playbook 504 accepts the input parameters as input, performs one or more actions based on the input values, and provides as output values matching the one or more specified output parameters.

FIG. 6 is a flowchart illustrating an example process 600 for executing, by an IT and security operations application, an automation playbook including a capability block implemented by an input playbook according to some examples. The example process 600 can be implemented, for example, by a computing device that comprises a processor and a non-transitory computer-readable medium. The non-transitory computer readable medium can be storing instructions that, when executed by the processor, can cause the processor to perform the operations of the illustrated process 600. Alternatively or additionally, the process 600 can be implemented using a non-transitory computer-readable medium storing instructions that, when executed by one or more processors, case the one or more processors to perform the operations of the process 600 of FIG. 6.

The process 600 includes, at block 602, causing, by an information technology (IT) and security operations application, display of an automation playbook including a capability block, wherein the automation playbook defines a collection of actions to be performed based on an event provided as input to the automation playbook, and wherein the capability block includes a parameter specification indicating set of one or more input parameters and one or more output parameters associated with the capability block.

The process 600 further includes, at block 604, receiving input selecting an input playbook to assign to the capability block, wherein the input playbook accepts as input the one or more input parameters and, upon execution, generates the one or more output parameters.

The process 600 further includes, at block 606, executing the automation playbook, wherein executing the automation playbook includes, upon reaching the capability block, invoking execution of the input playbook.

In some examples, the operations further include obtaining, from the input playbook, one or more output values corresponding to the one or more output parameters; and providing the one or more output values to a downstream component of the automation playbook.

In some examples, execution of the input playbook includes execution of an action provided by an app of the IT and security operations application, and wherein the app is configured to interface with a third-party application or service.

In some examples, the automation playbook is displayed in a visual playbook editor of the IT and security operations application, wherein the automation playbook includes a plurality of capability blocks including the capability block, and wherein the visual playbook editor indicates which capability blocks are not associated with an implementing input playbook.

In some examples, wherein the capability block is not associated with a specific app of the IT and security operations application.

In some examples, the capability block is a first capability block, and wherein the input playbook is a first input playbook associated with a first app associated with a first type of third-party application or service, wherein the automation playbook includes a second capability block, and wherein the second capability block is assigned a second input playbook associated with a second app associated with a second type of third-party application or service.

In some examples, wherein the input playbook is a first input playbook, wherein the first input playbook is assigned to the capability block at a first point in time, and wherein the method further comprises: receiving, at a second point in time, additional input selecting a second input playbook to assign to the capability block, wherein the first input playbook is associated with a first action implementation, and wherein the second input playbook is associated with a second action implementation that is different from the first action implementation; and executing the automation playbook, wherein executing the automation playbook includes, upon reaching the capability block, invoking execution of the second input playbook.

In some examples, the operations further include receiving, via a visual playbook editor, input selecting a repository storing a plurality of input playbooks including the input playbook.

In some examples, the input selecting the input playbook is first input, and the operations further include: receiving second input identifying a label associated with events triggering execution of the automation playbook; and wherein executing the automation playbook includes identifying an event including the label.

In some examples, the operations further include identifying, by the IT and security operations application, the input playbook from a plurality of candidate input playbooks for implementing the capability block, wherein the IT and security operations application identifies the input playbook based on matching the input playbook to the parameter specification; and causing, in a visual playbook editor, display of the input playbook as a recommended playbook for implementing the capability block.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 7:
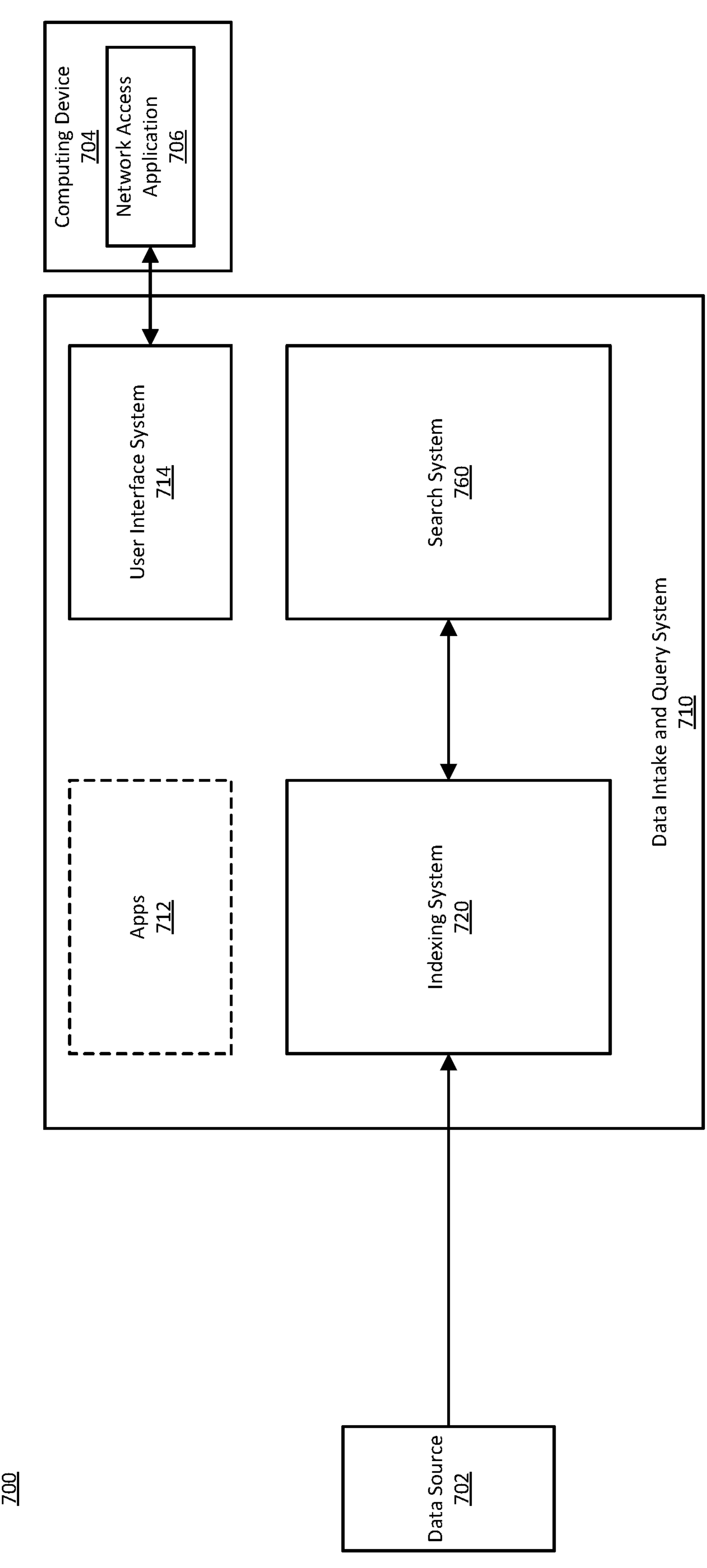
FIG. 7 is a block diagram illustrating an example computing environment that includes a data intake and query system according to some examples.

FIG. 7 is a block diagram illustrating an example computing environment 700 that includes a data intake and query system 710. The data intake and query system 710 obtains data from a data source 702 in the computing environment 700 and ingests the data using an indexing system 720. A search system 760 of the data intake and query system 710 enables users to navigate the indexed data. Though drawn with separate boxes, in some implementations the indexing system 720 and the search system 760 can have overlapping components. A computing device 704, running a network access application 706, can communicate with the data intake and query system 710 through a user interface system 714 of the data intake and query system 710. Using the computing device 704, a user can perform various operations with respect to the data intake and query system 710, such as administration of the data intake and query system 710, management and generation of "knowledge objects," initiating of searches, and generation of reports, among other operations. The data intake and query system 710 can further optionally include apps 712 that extend the search, analytics, and/or visualization capabilities of the data intake and query system 710.

The data intake and query system 710 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 710 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 710 can execute on a single computing device, or may be distributed over multiple computing devices. For example, the program code can include instructions for executing both indexing and search components (which may be part of the indexing system 720 and/or the search system 760, respectively), and can be executed on a computing device that also provides the data source 702. As another example, the program code can execute on one computing device, where the program code executes both indexing and search components, while another copy of the program code executes on a second computing device that provides the data source 702. As another example, the program code can execute only an indexing component or only a search component. In this example, a first instance of the program code that is executing the indexing component and a second instance of the program code that is executing the search component can be executing on the same computing device or on different computing devices.

The data source 702 of the computing environment 700 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 702 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 720 obtains machine date from the data source 702 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 720 does not require prior knowledge of the structure of incoming data (e.g., the indexing system 720 does not need to be provided with a schema describing the data). Additionally, the indexing system 720 retains a copy of the data as it was received by the indexing system 720 such that the original data is always available for searching (e.g., no data is discarded, though, in some examples, the indexing system 720 can be configured to do so).

The search system 760 searches the data stored by the indexing 720 system. As discussed in greater detail below, the search system 760 enables users associated with the computing environment 700 (and possibly also other users) to navigate the data, generate reports, and visualize results in "dashboards" output using a graphical interface. Using the facilities of the search system 760, users can obtain insights about the data, such as retrieving events from an index, calculating metrics, searching for specific conditions within a rolling time window, identifying patterns in the data, and predicting future trends, among other examples. To achieve greater efficiency, the search system 760 can apply map-reduce methods to parallelize searching of large volumes of data. Additionally, because the original data is available, the search system 760 can apply a schema to the data at search time. This allows different structures to be applied to the same data, or for the structure to be modified if or when the content of the data changes. Application of a schema at search time may be referred to herein as a late-binding schema technique.

The user interface system 714 provides mechanisms through which users associated with the computing environment 700 (and possibly others) can interact with the data intake and query system 710. These interactions can include configuration, administration, and management of the indexing system 720, initiation and/or scheduling of queries to the search system 760, receipt or reporting of search results, and/or visualization of search results. The user interface system 714 can include, for example, facilities to provide a command line interface or a web-based interface.

Users can access the user interface system 714 using a computing device 704 that communicates with data intake and query system 710, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 700. For example, a person can log in as a particular user and, using the user's digital information, can access the data intake and query system 710. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 704 can provide a human-machine interface through which a person can have a digital presence in the computing environment 700 in the form of a user. The computing device 704 is an electronic device having one or more processors and a memory capable of storing instructions for execution by the one or more processors. The computing device 704 can further include input/output (I/O) hardware and a network interface. Applications executed by the computing device 704 can include a network access application 706, which can a network interface of the client computing device 704 to communicate, over a network, with the user interface system 714 of the data intake and query system 710. The user interface system 714 can use the network access application 706 to generate user interfaces that enable a user to interact with the data intake and query system 710. A web browser is one example of a network access application. A shell tool can also be used as a network access application. In some examples, the data intake and query system 710 is an application executing on the computing device 704. In such examples, the network access application 706 can access the user interface system 714 without needed to go over a network.

The data intake and query system 710 can optionally include apps 712. An app of the data intake and query system 710 is a collection of configurations, knowledge objects (a user-defined entity that enriches the data in the data intake and query system 710), views, and dashboards that may provide additional functionality, different techniques for searching the data, and/or additional insights into the data. The data intake and query system 710 can execute multiple applications simultaneously. Example applications include an information technology service intelligence application, which can monitor and analyze the performance and behavior of the computing environment 700, and an enterprise security application, which can include content and searches to assist security analysts in diagnosing and acting on anomalous or malicious behavior in the computing environment 700.

Though FIG. 7 illustrates only one data source, in practical implementations, the computing environment 700 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 700, the data intake and query system 710 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud and has digital access to resources provided by the computing devices only to the extent that such access is enabled by the provider entity.

In some implementations, the computing environment 700 can include on-prem and cloud-based computing resources, or only cloud-based resources. For example, an entity may have on-prem computing devices and a private cloud. In this example, the entity operates the data intake and query system 710 and can choose to execute the data intake and query system 710 on an on-prem computing device or in the cloud. In another example, a provider entity operates the data intake and query system 710 in a public cloud and provides the functionality of the data intake and query system 710 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 710. In some implementations, the entity providing the data intake and query system 710 is itself subscribing to the cloud services of a cloud service provider. As an example, a first entity provides computing resources under a public cloud service model, a second entity subscribes to the cloud services of the first provider entity and uses the cloud computing resources to operate the data intake and query system 710, and a third entity can subscribe to the services of the second provider entity in order to use the functionality of the data intake and query system 710. In this example, the data sources are associated with the third entity, users accessing the data intake and query system 710 are associated with the third entity, and the analytics and insights provided by the data intake and query system 710 are for purposes of the third entity's operations.

Figure 8:
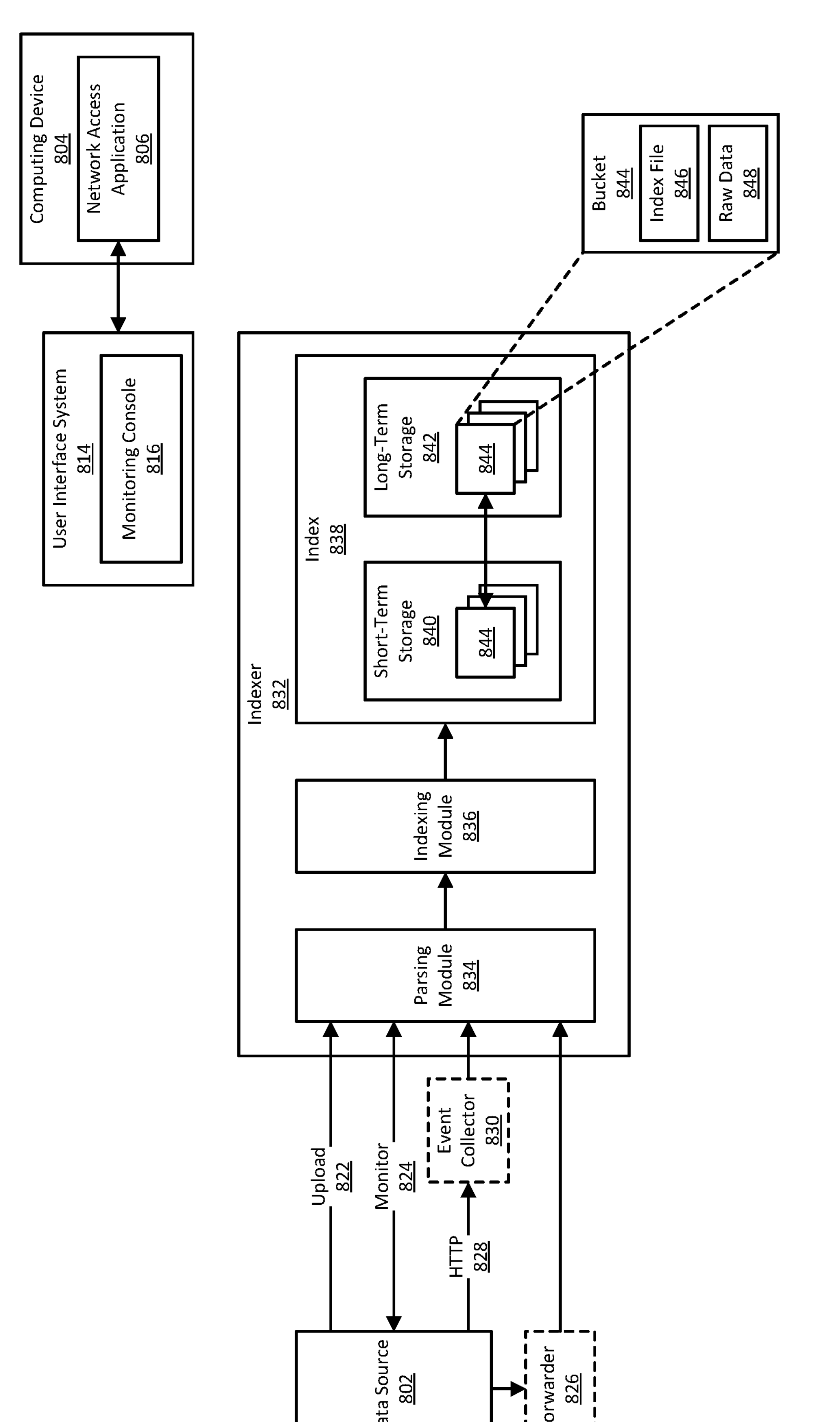
FIG. 8 is a block diagram illustrating in greater detail an example of an indexing system of a data intake and query system according to some examples.

FIG. 8 is a block diagram illustrating in greater detail an example of an indexing system 820 of a data intake and query system, such as the data intake and query system 710 of FIG. 7. The indexing system 820 of FIG. 8 uses various methods to obtain machine data from a data source 802 and stores the data in an index 838 of an indexer 832. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 820 enables the data intake and query system to obtain the machine data produced by the data source 802 and to store the data for searching and retrieval.

Users can administer the operations of the indexing system 820 using a computing device 804 that can access the indexing system 820 through a user interface system 814 of the data intake and query system. For example, the computing device 804 can be executing a network access application 806, such as a web browser or a terminal, through which a user can access a monitoring console 816 provided by the user interface system 814. The monitoring console 816 can enable operations such as: identifying the data source 802 for indexing; configuring the indexer 832 to index the data from the data source 802; configuring a data ingestion method; configuring, deploying, and managing clusters of indexers; and viewing the topology and performance of a deployment of the data intake and query system, among other operations. The operations performed by the indexing system 820 may be referred to as "index time" operations, which are distinct from "search time" operations that are discussed further below.

The indexer 832, which may be referred to herein as a data indexing component, coordinates and performs most of the index time operations. The indexer 832 can be implemented using program code that can be executed on a computing device. The program code for the indexer 832 can be stored on a non-transitory computer-readable medium (e.g., a magnetic, optical, or solid-state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 832. In some implementations, the indexer 832 executes on the computing device 804 through which a user can access the indexing system 820. In some implementations, the indexer 832 executes on a different computing device.

The indexer 832 may be executing on the computing device that also provides the data source 802 or may be executing on a different computing device. In implementations wherein the indexer 832 is on the same computing device as the data source 802, the data produced by the data source 802 may be referred to as "local data." In other implementations the data source 802 is a component of a first computing device and the indexer 832 executes on a second computing device that is different from the first computing device. In these implementations, the data produced by the data source 802 may be referred to as "remote data." In some implementations, the first computing device is "on-prem" and in some implementations the first computing device is "in the cloud." In some implementations, the indexer 832 executes on a computing device in the cloud and the operations of the indexer 832 are provided as a service to entities that subscribe to the services provided by the data intake and query system.

For a given data produced by the data source 802, the indexing system 820 can be configured to use one of several methods to ingest the data into the indexer 832. These methods include upload 822, monitor 824, using a forwarder 826, or using HyperText Transfer Protocol (HTTP 828) and an event collector 830. These and other methods for data ingestion may be referred to as "getting data in" (GDI) methods.

Using the upload 822 method, a user can instruct the indexing system 820 to specify a file for uploading into the indexer 832. For example, the monitoring console 816 can include commands or an interface through which the user can specify where the file is located (e.g., on which computing device and/or in which directory of a file system) and the name of the file. Once uploading is initiated, the indexer 832 processes the file, as discussed further below. Uploading is a manual process and occurs when instigated by a user. For automated data ingestion, the other ingestion methods are used.

The monitor 824 method enables the indexing system 820 to monitor the data source 802 and continuously or periodically obtain data produced by the data source 802 for ingestion by the indexer 832. For example, using the monitoring console 816, a user can specify a file or directory for monitoring. In this example, the indexing system 820 can execute a monitoring process that detects whenever data is added to the file or directory and causes the data to be sent to the indexer 832. As another example, a user can specify a network port for monitoring. In this example, a monitoring process can capture data received at or transmitting from the network port and cause the data to be sent to the indexer 832. In various examples, monitoring can also be configured for data sources such as operating system event logs, performance data generated by an operating system, operating system registries, operating system directory services, and other data sources.

Monitoring is available when the data source 802 is local to the indexer 832 (e.g., the data source 802 is on the computing device where the indexer 832 is executing). Other data ingestion methods, including forwarding and the event collector 830, can be used for either local or remote data sources.

A forwarder 826, which may be referred to herein as a data forwarding component, is a software process that sends data from the data source 802 to the indexer 832. The forwarder 826 can be implemented using program code that can be executed on the computer device that provides the data source 802. A user launches the program code for the forwarder 826 on the computing device that provides the data source 802. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 826 can provide various capabilities. For example, the forwarder 826 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 826 can break the data into individual events (event generation is discussed further below) and send the events to a receiver. Other operations that the forwarder 826 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 830 provides an alternate method for obtaining data from the data source 802. The event collector 830 enables data and application events to be sent to the indexer 832 using HTTP 828. The event collector 830 can be implemented using program code that can be executing on a computing device. The program code may be a component of the data intake and query system or can be a standalone component that can be executed independently of the data intake and query system and operates in cooperation with the data intake and query system.

To use the event collector 830, a user can, for example using the monitoring console 816 or a similar interface provided by the user interface system 814, enable the event collector 830 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 802 as an alternative method to using a username and password for authentication.

To send data to the event collector 830, the data source 802 is supplied with a token and can then send HTTP 828 requests to the event collector 830. To send HTTP 828 requests, the data source 802 can be configured to use an HTTP client and/or to use logging libraries such as those supplied by Java, JavaScript, and .NET libraries. An HTTP client enables the data source 802 to send data to the event collector 830 by supplying the data, and a Uniform Resource Identifier (URI) for the event collector 830 to the HTTP client. The HTTP client then handles establishing a connection with the event collector 830, transmitting a request containing the data, closing the connection, and receiving an acknowledgment if the event collector 830 sends one. Logging libraries enable HTTP 828 requests to the event collector 830 to be generated directly by the data source. For example, an application can include or link a logging library, and through functionality provided by the logging library manage establishing a connection with the event collector 830, transmitting a request, and receiving an acknowledgement.

An HTTP 828 request to the event collector 830 can contain a token, a channel identifier, event metadata, and/or event data. The token authenticates the request with the event collector 830. The channel identifier, if available in the indexing system 820, enables the event collector 830 to segregate and keep separate data from different data sources. The event metadata can include one or more key-value pairs that describe the data source 802 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 830 extracts events from HTTP 828 requests and sends the events to the indexer 832. The event collector 830 can further be configured to send events or event data to one or more indexers. Extracting the events can include associating any metadata in a request with the event or events included in the request. In these implementations, event generation by the indexer 832 (discussed further below) is bypassed, and the indexer 832 moves the events directly to indexing. In some implementations, the event collector 830 extracts event data from a request and outputs the event data to the indexer 832, and the indexer generates events from the event data. In some implementations, the event collector 830 sends an acknowledgement message to the data source 802 to indicate that the event collector 830 has received a particular request form the data source 802, and/or to indicate to the data source 802 that events in the request have been added to an index.

The indexer 832 ingests incoming data and transforms the data into searchable knowledge in the form of events. In the data intake and query system, an event is a single piece of data that represents activity of the component represented in FIG. 8 by the data source 802. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 832 can include a parsing module 834 and an indexing module 836 for generating and storing the events. The parsing module 834 and indexing module 836 can be modular and pipelined, such that one component can be operating on a first set of data while the second component is simultaneously operating on a second sent of data. Additionally, the indexer 832 may at any time have multiple instances of the parsing module 834 and indexing module 836, with each set of instances configured to simultaneously operate on data from the same data source or from different data sources. The parsing module 834 and indexing module 836 are illustrated to facilitate discussion, with the understanding that implementations with other components are possible to achieve the same functionality.

The parsing module 834 determines information about event data, where the information can be used to identify events within the event data. For example, the parsing module 834 can associate a source type with the event data. A source type identifies the data source 802 and describes a possible data structure of event data produced by the data source 802. For example, the source type can indicate which fields to expect in events generated at the data source 802 and the keys for the values in the fields, and possibly other information such as sizes of fields, an order of the fields, a field separator, and so on. The source type of the data source 802 can be specified when the data source 802 is configured as a source of event data. Alternatively, the parsing module 834 can determine the source type from the event data, for example from an event field or using machine learning.

Other information that the parsing module 834 can determine includes timestamps. In some cases, an event includes a timestamp as a field, and the timestamp indicates a point in time when the action represented by the event occurred or was recorded by the data source 802 as event data. In these cases, the parsing module 834 may be able to determine from the source type associated with the event data that the timestamps can be extracted from the events themselves. In some cases, an event does not include a timestamp and the parsing module 834 determines a timestamp for the event, for example from a name associated with the event data from the data source 802 (e.g., a file name when the event data is in the form of a file) or a time associated with the event data (e.g., a file modification time). As another example, when the parsing module 834 is not able to determine a timestamp from the event data, the parsing module 834 may use the time at which it is indexing the event data. As another example, the parsing module 834 can use a user-configured rule to determine the timestamps to associate with events.

The parsing module 834 can further determine event boundaries. In some cases, a single line (e.g., a sequence of characters ending with a line termination) in event data represents one event while in other cases, a single line represents multiple events. In yet other cases, one event may span multiple lines within the event data. The parsing module 834 may be able to determine event boundaries from the source type associated with the event data, for example from a data structure indicated by the source type. In some implementations, a user can configure rules the parsing module 834 can use to identify event boundaries.

The parsing module 834 can further extract data from events and possibly also perform transformations on the events. For example, the parsing module 834 can extract a set of fields for each event, such as a host or hostname, source or source name, and/or source type. The parsing module 834 may extract certain fields by default or based on a user configuration. Alternatively or additionally, the parsing module 834 may add fields to events, such as a source type or a user-configured field. As another example of a transformation, the parsing module 834 can anonymize fields in events to mask sensitive information, such as social security numbers or account numbers. Anonymizing fields can include changing or replacing values of specific fields. The parsing component 834 can further perform user-configured transformations.

The parsing module 834 outputs the results of processing incoming event data to the indexing module 836, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 832 can be configured to identify searchable segments that are parts of fields, searchable segments that are entire fields, or both. The parsing module 834 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 846, to find event data that matches a search query. In some implementations, segmentation can alternatively be performed by the forwarder 826. Segmentation can also be disabled, in which case the indexer 832 will not build a lexicon for the event data. When segmentation is disabled, the search system searches the event data directly.

Building index data structures generates the index 838. The index 838 is a storage data structure on a storage device (e.g., a disk drive or other physical device for storing digital data). The storage device may be a component of the computing device on which the indexer 832 is operating (referred to herein as local storage) or may be a component of a different computing device (referred to herein as remote storage) that the indexer 838 has access to over a network. The indexer 832 can include more than one index and can include indexes of different types. For example, the indexer 832 can include event indexes, which impose minimal structure on stored data and can accommodate any type of data. As another example, the indexer 832 can include metrics indexes, which use a highly structured format to handle the higher volume and lower latency demands associated with metrics data.

The indexing module 836 organizes files in the index 838 in directories referred to as buckets. The files in a bucket 844 can include raw data files, index files, and possibly also other metadata files. As used herein, "raw data" means data as when the data was produced by the data source 802, without alteration to the format or content. As noted previously, the parsing component 834 may add fields to event data and/or perform transformations on fields in the event data, and thus a raw data file 848 can include, in addition to or instead of raw data, what is referred to herein as enriched raw data. The raw data file 848 may be compressed to reduce disk usage. An index file 846, which may also be referred to herein as a "time-series index" or tsidx file, contains metadata that the indexer 832 can use to search a corresponding raw data file 848. As noted above, the metadata in the index file 846 includes a lexicon of the event data, which associates each unique keyword in the event data in the raw data file 848 with a reference to the location of event data within the raw data file 848. The keyword data in the index file 846 may also be referred to as an inverted index. In various implementations, the data intake and query system can use index files for other purposes, such as to store data summarizations that can be used to accelerate searches.

A bucket 844 includes event data for a particular range of time. The indexing module 836 arranges buckets in the index 838 according to the age of the buckets, such that buckets for more recent ranges of time are stored in short-term storage 840 and buckets for less recent ranges of time are stored in long-term storage 842. Short-term storage 840 may be faster to access while long-term storage 842 may be slower to access. Buckets may move from short-term storage 840 to long-term storage 842 according to a configurable data retention policy, which can indicate at what point in time a bucket is old enough to be moved.

A bucket's location in short-term storage 840 or long-term storage 842 can also be indicated by the bucket's status. As an example, a bucket's status can be "hot," "warm," "cold," "frozen," or "thawed." In this example, hot bucket is one to which the indexer 832 is writing data and the bucket becomes a warm bucket when the indexer 832 stops writing data to it. In this example, both hot and warm buckets reside in short-term storage 840. Continuing this example, when a warm bucket is moved to long-term storage 842, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 820 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each bucket must exist within the cluster), and indexers to which buckets are copied may be selected to optimize distribution of data across the cluster.

A user can view the performance of the indexing system 820 through the monitoring console 816 provided by the user interface system 814. Using the monitoring console 816, the user can configure and monitor an index cluster, and see information such as disk usage by an index, volume usage by an indexer, index and volume size over time, data age, statistics for bucket types, and bucket settings, among other information.

Figure 9:
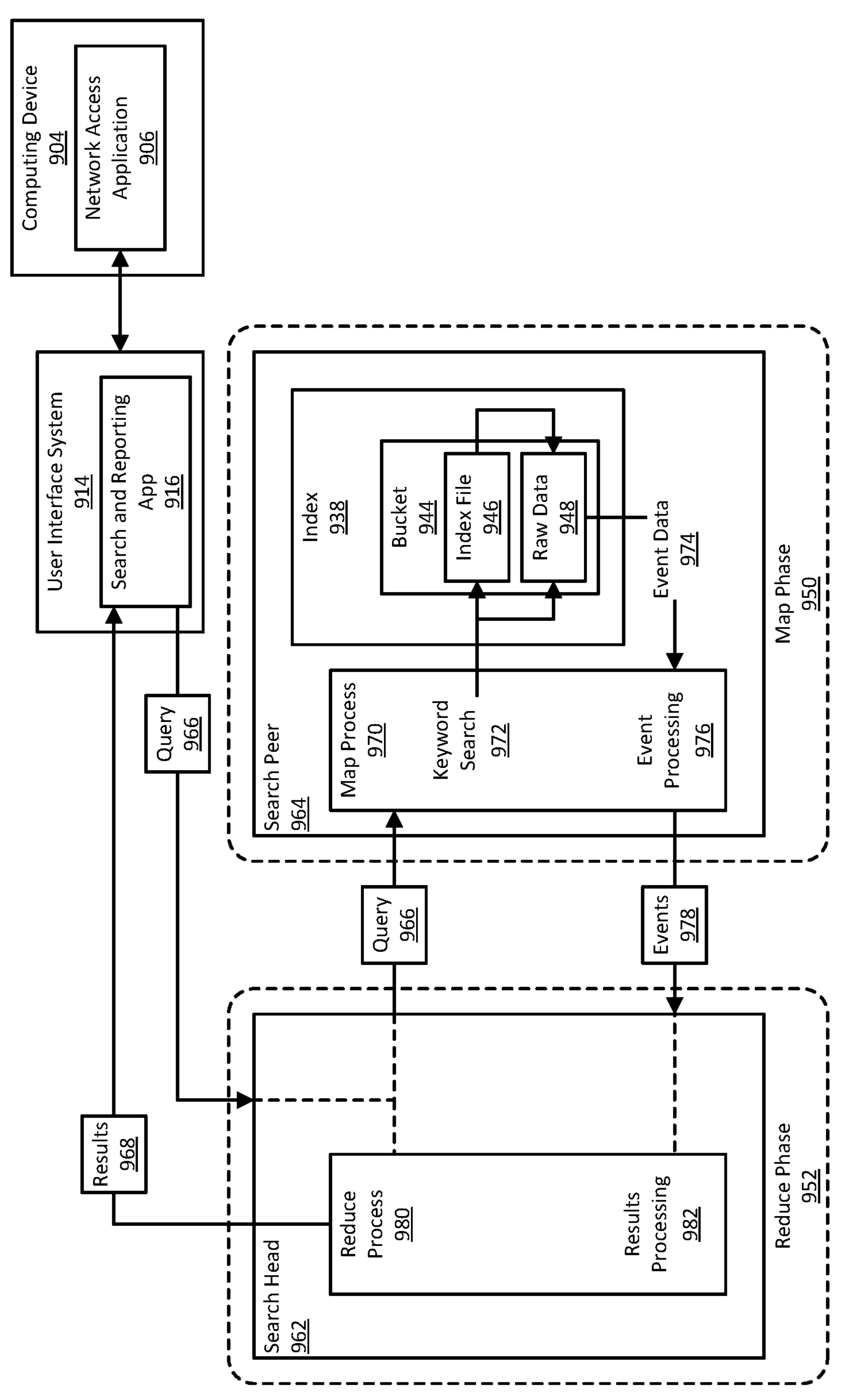
FIG. 9 is a block diagram illustrating in greater detail an example of the search system of a data intake and query system according to some examples.

FIG. 9 is a block diagram illustrating in greater detail an example of the search system 960 of a data intake and query system, such as the data intake and query system 710 of FIG. 7. The search system 960 of FIG. 9 issues a query 966 to a search head 962, which sends the query 966 to a search peer 964. Using a map process 970, the search peer 964 searches the appropriate index 938 for events identified by the query 966 and sends events 978 so identified back to the search head 962. Using a reduce process 982, the search head 962 processes the events 978 and produces results 968 to respond to the query 966. The results 968 can provide useful insights about the data stored in the index 938. These insights can aid in the administration of information technology systems, in security analysis of information technology systems, and/or in analysis of the development environment provided by information technology systems.

The query 966 that initiates a search is produced by a search and reporting app 916 that is available through the user interface system 914 of the data intake and query system. Using a network access application 906 executing on a computing device 904, a user can input the query 966 into a search field provided by the search and reporting app 916. Alternatively or additionally, the search and reporting app 916 can include pre-configured queries or stored queries that can be activated by the user. In some cases, the search and reporting app 916 initiates the query 966 when the user enters the query 966. In these cases, the query 966 may be referred to as an "ad-hoc" query. In some cases, the search and reporting app 916 initiates the query 966 based on a schedule. For example, the search and reporting app 916 can be configured to execute the query 966 once per hour, once per day, at a specific time, on a specific date, or at some other time that can be specified by a date, time, and/or frequency. These types of queries may be referred to as scheduled queries.

The query 966 is specified using a search processing language. The search processing language includes commands that the search peer 964 will use to identify events to return in the search results 968. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 966 to include sequential commands, where a subsequent command may operate on the results of a prior command. As an example, sequential commands may be separated in the query 966 by a vertical line ("|" or "pipe") symbol.

In addition to one or more search commands, the query 966 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 966 occurs in two broad phases: a map phase 950 and a reduce phase 952. The map phase 950 takes place across one or more search peers. In the map phase 950, the search peers locate event data that matches the search terms in the search query 966 and sorts the event data into field-value pairs. When the map phase 950 is complete, the search peers send events that they have found to one or more search heads for the reduce phase 952. During the reduce phase 952, the search heads process the events through commands in the search query 966 and aggregate the events to produce the final search results 968.

A search head, such as the search head 962 illustrated in FIG. 9, is a component of the search system 960 that manages searches. The search head 962, which may also be referred to herein as a search management component, can be implemented using program code that can be executed on a computing device. The program code for the search head 962 can be stored on a non-transitory computer-readable medium and from this medium can be loaded or copied to the memory of a computing device. One or more hardware processors of the computing device can read the program code from the memory and execute the program code in order to implement the operations of the search head 962.

Upon receiving the search query 966, the search head 962 directs the query 966 to one or more search peers, such as the search peer 964 illustrated in FIG. 9. "Search peer" is an alternate name for "indexer" and a search peer may be largely similar to the indexer described previously. The search peer 964 may be referred to as a "peer node" when the search peer 964 is part of an indexer cluster. The search peer 964, which may also be referred to as a search execution component, can be implemented using program code that can be executed on a computing device. In some implementations, one set of program code implements both the search head 962 and the search peer 964 such that the search head 962 and the search peer 964 form one component. In some implementations, the search head 962 is an independent piece of code that performs searching and no indexing functionality. In these implementations, the search head 962 may be referred to as a dedicated search head.

The search head 962 may consider multiple criteria when determining whether to send the query 966 to the particular search peer 964. For example, the search system 960 may be configured to include multiple search peers that each have duplicative copies of at least some of the event data. In this example, the sending the search query 966 to more than one search peer allows the search system 960 to distribute the search workload across different hardware resources. As another example, search system 960 may include different search peers for different purposes (e.g., one has an index storing a first type of data or from a first data source while a second has an index storing a second type of data or from a second data source). In this example, the search query 966 may specify which indexes to search, and the search head 962 will send the query 966 to the search peers that have those indexes.

To identify events 978 to send back to the search head 962, the search peer 964 performs a map process 970 to obtain event data 974 from the index 938 that is maintained by the search peer 964. During a first phase of the map process 970, the search peer 964 identifies buckets that have events that are described by the time indicator in the search query 966. As noted above, a bucket contains events whose timestamps fall within a particular range of time. For each bucket 944 whose events can be described by the time indicator, during a second phase of the map process 970, the search peer 964 performs a keyword search 972 using search terms specified in the search query 966. The search terms can be one or more of keywords, phrases, fields, Boolean expressions, and/or comparison expressions that in combination describe events being searched for. When segmentation is enabled at index time, the search peer 964 performs the keyword search 972 on the bucket's index file 946. As noted previously, the index file 946 includes a lexicon of the searchable terms in the events stored in the bucket's raw data 948 file. The keyword search 972 searches the lexicon for searchable terms that correspond to one or more of the search terms in the query 966. As also noted above, the lexicon incudes, for each searchable term, a reference to each location in the raw data 948 file where the searchable term can be found. Thus, when the keyword search identifies a searchable term in the index file 946 that matches query 966, the search peer 964 can use the location references to extract from the raw data 948 file the event data 974 for each event that include the searchable term.

In cases where segmentation was disabled at index time, the search peer 964 performs the keyword search 972 directly on the raw data 948 file. To search the raw data 948, the search peer 964 may identify searchable segments in events in a similar manner as when the data was indexed. Thus, depending on how the search peer 964 is configured, the search peer 964 may look at event fields and/or parts of event fields to determine whether an event matches the query 966. Any matching events can be added to the event data 974 read from the raw data 948 file. The search peer 964 can further be configured to enable segmentation at search time, so that searching of the index 938 causes the search peer 964 to build a lexicon in the index file 946.

The event data 974 obtained from the raw data 948 file includes the full text of each event found by the keyword search 972. During a third phase of the map process 970, the search peer 964 performs event processing 976 on the event data 974, with the steps performed being determined by the configuration of the search peer 964 and/or commands in the search query 966. For example, the search peer 964 can be configured to perform field discovery and field extraction. Field discovery is a process by which the search peer 964 identifies and extracts key-value pairs from the events in the event data 974. The search peer 964 can, for example, be configured to automatically extract the first 100 fields (or another number of fields) in the event data 974 that can be identified as key-value pairs. As another example, the search peer 964 can extract any fields explicitly mentioned in the search query 966. The search peer 964 can, alternatively or additionally, be configured with particular field extractions to perform.

Other examples of steps that can be performed during event processing 976 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 964 sends processed events 978 to the search head 962, which performs a reduce process 980. The reduce process 980 potentially receives events from multiple search peers and performs various results processing 982 steps on the events. The results processing 982 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 982 can further include applying commands from the search query 966 to the events. The query 966 can include, for example, commands for evaluating and/or manipulating fields (e.g., to generate new fields from existing fields or parse fields that have more than one value). As another example, the query 966 can include commands for calculating statistics over the events, such as counts of the occurrences of fields, or sums, averages, ranges, and so on, of field values. As another example, the query 966 can include commands for generating statistical values for purposes of generating charts of graphs of the events.

Through results processing 982, the reduce process 980 produces the events found by processing the search query 966, as well as some information about the events, which the search head 962 outputs to the search and reporting app 916 as search results 968. The search and reporting app 916 can generate visual interfaces for viewing the search results 968. The search and reporting app 916 can, for example, output visual interfaces for the network access application 906 running on a computing device 904 to generate.

The visual interfaces can include various visualizations of the search results 968, such as tables, line or area charts, Choropleth maps, or single values. The search and reporting app 916 can organize the visualizations into a dashboard, where the dashboard includes a panel for each visualization. A dashboard can thus include, for example, a panel listing the raw event data for the events in the search results 968, a panel listing fields extracted at index time and/or found through field discovery along with statistics for those fields, and/or a timeline chart indicating how many events occurred at specific points in time (as indicated by the timestamps associated with each event). In various implementations, the search and reporting app 916 can provide one or more default dashboards. Alternatively or additionally, the search and reporting app 916 can include functionality that enables a user to configure custom dashboards.

The search and reporting app 916 can also enable further investigation into the events in the search results 968. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 966. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 10:
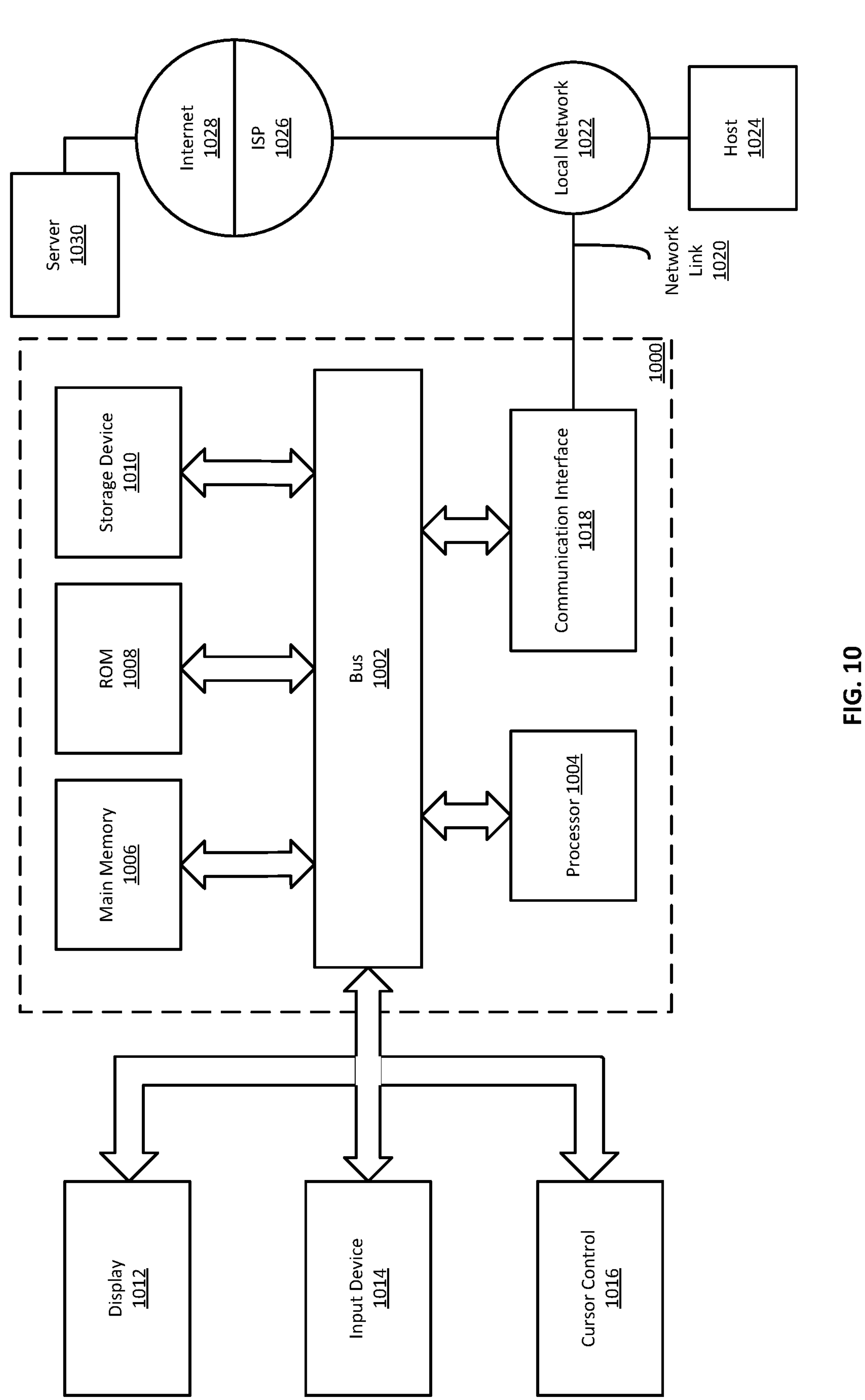
FIG. 10 is a block diagram illustrating an example computer system that may be used in some embodiments.

FIG. 10 is a block diagram that illustrates a computer system 1000 utilized in implementing the above-described techniques, according to an example. Computer system 1000 may be, for example, a desktop computing device, laptop computing device, tablet, smartphone, server appliance, computing mainframe, multimedia device, handheld device, networking apparatus, or any other suitable device.

Computer system 1000 includes one or more buses 1002 or other communication mechanism for communicating information, and one or more hardware processors 1004 coupled with buses 1002 for processing information. Hardware processors 1004 may be, for example, general purpose microprocessors. Buses 1002 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1000 also includes a main memory 1006, such as a random access memory (RAM) or other dynamic or volatile storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 a special-purpose machine that is customized to perform the operations specified in the instructions.

Computer system 1000 further includes one or more read only memories (ROM) 1008 or other static storage devices coupled to bus 1002 for storing static information and instructions for processor 1004. One or more storage devices 1010, such as a solid-state drive (SSD), magnetic disk, optical disk, or other suitable non-volatile storage device, is provided and coupled to bus 1002 for storing information and instructions.

Computer system 1000 may be coupled via bus 1002 to one or more displays 1012 for presenting information to a computer user. For instance, computer system 1000 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1012 may include, without limitation, plasma display devices, projectors, cathode ray tube (CRT) monitors, electronic paper, virtual reality headsets, braille terminal, and/or any other suitable device for outputting information to a computer user. In an example, any suitable type of output device, such as, for instance, an audio speaker or printer, may be utilized instead of a display 1012.

One or more input devices 1014 are coupled to bus 1002 for communicating information and command selections to processor 1004. One example of an input device 1014 is a keyboard, including alphanumeric and other keys. Another type of user input device 1014 is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. Yet other examples of suitable input devices 1014 include a touch-screen panel affixed to a display 1012, cameras, microphones, accelerometers, motion detectors, and/or other sensors. In an example, a network-based input device 1014 may be utilized. In such an example, user input and/or other information or commands may be relayed via routers and/or switches on a Local Area Network (LAN) or other suitable shared network, or via a peer-to-peer network, from the input device 1014 to a network link 1020 on the computer system 1000.

A computer system 1000 may implement techniques described herein using customized hard-wired logic, one or more ASICs or FPGAs, firmware and/or program logic which in combination with the computer system causes or programs computer system 1000 to be a special-purpose machine. According to one example, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In other examples, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or a solid-state drive of a remote computer. The remote computer can load the instructions into its dynamic memory and use a modem to send the instructions over a network, such as a cable network or cellular network, as modulate signals. A modem local to computer system 1000 can receive the data on the network and demodulate the signal to decode the transmitted instructions. Appropriate circuitry can then place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

A computer system 1000 may also include, in an example, one or more communication interfaces 1018 coupled to bus 1002. A communication interface 1018 provides a data communication coupling, typically two-way, to a network link 1020 that is connected to a local network 1022. For example, a communication interface 1018 may be an integrated services digital network (ISDN) card, cable modem, satellite modem, or a modem to provide a data communication connection to a corresponding type of telephone line. As another example, the one or more communication interfaces 1018 may include a local area network (LAN) card to provide a data communication connection to a compatible LAN. As yet another example, the one or more communication interfaces 1018 may include a wireless network interface controller, such as an 802.11-based controller, Bluetooth controller, Long Term Evolution (LTE) modem, and/or other types of wireless interfaces. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by a Service Provider 1026. Service Provider 1026, which may for example be an Internet Service Provider (ISP), in turn provides data communication services through a wide area network, such as the world-wide packet data communication network now commonly referred to as the "internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

In an example, computer system 1000 can send messages and receive data, including program code and/or other types of instructions, through the network(s), network link 1020, and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution. As another example, information received via a network link 1020 may be interpreted and/or processed by a software component of the computer system 1000, such as a web browser, application, or server, which in turn issues instructions based thereon to a processor 1004, possibly via an operating system and/or other intermediate layers of software components.

In some examples, some or all the systems described herein may be or comprise server computer systems, including one or more computer systems 1000 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method comprising:

causing, by an information technology (IT) and security operations application, display of an automation playbook including a capability block, wherein the automation playbook defines a collection of actions to be performed based on an event provided as input to the automation playbook, and wherein the capability block defines a generic action to be performed and is not associated with any specific application, computing asset, or environment-dependent configuration prior to distribution of the automation playbook, when the automation playbook is configured or executed in a user's environment;

receiving input selecting an input playbook associated with a first app to assign to the capability block, wherein the input playbook accepts as input one or more input parameters and, upon execution, generates one or more output parameters; and executing the automation playbook, wherein executing the automation playbook includes, upon reaching the capability block, invoking execution of the input playbook;

wherein the automation playbook includes a second capability block that is assigned a second input playbook associated with a second app.

2. The computer-implemented method of claim 1, further comprising:

obtaining, from the input playbook, one or more output values corresponding to the one or more output parameters; and providing the one or more output values to a downstream component of the automation playbook.

3. The computer-implemented method of claim 1, wherein execution of the input playbook includes execution of an action provided by an app of the IT and security operations application, and wherein the app is configured to interface with a third-party application or service.

4. The computer-implemented method of claim 1, wherein the automation playbook is displayed in a visual playbook editor of the IT and security operations application, wherein the automation playbook includes a plurality of capability blocks including the capability block, and wherein the visual playbook editor indicates which capability blocks are not associated with an implementing input playbook.

5. The computer-implemented method of claim 1, wherein the first app is associated with a first type of third-party application or service, wherein the second app is associated with a second type of third-party application or service.

6. The computer-implemented method of claim 1, wherein the input playbook is a first input playbook, wherein the first input playbook is assigned to the capability block at a first point in time, and wherein the method further comprises:

receiving, at a second point in time, additional input selecting a second input playbook to assign to the capability block, wherein the first input playbook is associated with a first action implementation, and wherein the second input playbook is associated with a second action implementation that is different from the first action implementation; and executing the automation playbook, wherein executing the automation playbook includes, upon reaching the capability block, invoking execution of the second input playbook.

7. The computer-implemented method of claim 1, further comprising receiving, via a visual playbook editor, input selecting a repository storing a plurality of input playbooks including the input playbook.

8. The computer-implemented method of claim 1, wherein the input selecting the input playbook is first input, and wherein the method further comprises:

receiving second input identifying a label associated with events triggering execution of the automation playbook, wherein executing the automation playbook includes identifying an event including the label.

9. The computer-implemented method of claim 1, further comprising:

identifying, by the IT and security operations application, the input playbook from a plurality of candidate input playbooks for implementing the capability block, wherein the IT and security operations application identifies the input playbook based on matching the input playbook to a parameter specification; and causing, in a visual playbook editor, display of the input playbook as a recommended playbook for implementing the capability block.

10. A computing device comprising:

a processor; and a non-transitory computer-readable medium having stored thereon instructions configured for execution by the processor, which cause the processor to perform operations including:

causing, by an information technology (IT) and security operations application, display of an automation playbook including a capability block, wherein the automation playbook defines a collection of actions to be performed based on an event provided as input to the automation playbook, and wherein the capability block defines a generic action to be performed and is not associated with any specific application, computing asset, or environment-dependent configuration prior to distribution of the automation playbook, when the automation playbook is configured or executed in a user's environment;

receiving input selecting an input playbook associated with a first app to assign to the capability block, wherein the input playbook accepts as input one or more input parameters and, upon execution, generates one or more output parameters; and executing the automation playbook, wherein executing the automation playbook includes, upon reaching the capability block, invoking execution of the input playbook;

wherein the automation playbook includes a second capability block that is assigned a second input playbook associated with a second app.

11. The computing device of claim 10, where the operations further include:

obtaining, from the input playbook, one or more output values corresponding to the one or more output parameters; and providing the one or more output values to a downstream component of the automation playbook.

12. The computing device of claim 10, wherein execution of the input playbook includes execution of an action provided by an app of the IT and security operations application, and wherein the app is configured to interface with a third-party application or service.

13. The computing device of claim 10, wherein the automation playbook is displayed in a visual playbook editor of the IT and security operations application, wherein the automation playbook includes a plurality of capability blocks including the capability block, and wherein the visual playbook editor indicates which capability blocks are not associated with an implementing input playbook.

14. A non-transitory, computer-readable medium having stored thereon instructions that, when executed by one or more processors, cause the one or more processors to perform operations including:

causing, by an information technology (IT) and security operations application, display of an automation playbook including a capability block, wherein the automation playbook defines a collection of actions to be performed based on an event provided as input to the automation playbook, and wherein the capability block defines a generic action to be performed and is not associated with any specific application, computing asset, or environment-dependent configuration prior to distribution of the automation playbook, when the automation playbook is configured or executed in a user's environment;

receiving input selecting an input playbook associated with a first app to assign to the capability block, wherein the input playbook accepts as input one or more input parameters and, upon execution, generates one or more output parameters; and executing the automation playbook, wherein executing the automation playbook includes, upon reaching the capability block, invoking execution of the input playbook;

wherein the automation playbook includes a second capability block that is assigned a second input playbook associated with a second app.

15. The non-transitory, computer-readable medium of claim 14, wherein the operations further include:

obtaining, from the input playbook, one or more output values corresponding to the one or more output parameters; and providing the one or more output values to a downstream component of the automation playbook.

16. The non-transitory, computer-readable medium of claim 14, wherein execution of the input playbook includes execution of an action provided by an app of the IT and security operations application, and wherein the app is configured to interface with a third-party application or service.

17. The non-transitory, computer-readable medium of claim 14, wherein the automation playbook is displayed in a visual playbook editor of the IT and security operations application, wherein the automation playbook includes a plurality of capability blocks including the capability block, and wherein the visual playbook editor indicates which capability blocks are not associated with an implementing input playbook.

* * * * *